US011949638B1

(12) United States Patent
Rosenberg

(10) Patent No.: US 11,949,638 B1
(45) Date of Patent: Apr. 2, 2024

(54) METHODS AND SYSTEMS FOR HYPERCHAT CONVERSATIONS AMONG LARGE NETWORKED POPULATIONS WITH COLLECTIVE INTELLIGENCE AMPLIFICATION

(71) Applicant: Unanimous A. I., Inc., Arlington, VA (US)

(72) Inventor: Louis B. Rosenberg, San Luis Obispo, CA (US)

(73) Assignee: Unanimous A. I., Inc., Arlington, VA (US)

( * ) Notice: Subject to any disclaimer, the term of this patent is extended or adjusted under 35 U.S.C. 154(b) by 0 days.

(21) Appl. No.: 18/240,286

(22) Filed: Aug. 30, 2023

Related U.S. Application Data

(60) Provisional application No. 63/449,986, filed on Mar. 4, 2023.

(51) Int. Cl.
*H04L 51/216* (2022.01)
*H04L 51/04* (2022.01)
(Continued)

(52) U.S. Cl.
CPC ............ *H04L 51/046* (2013.01); *H04L 51/04* (2013.01); *H04L 51/216* (2022.05); *H04L 51/56* (2022.05)

(58) Field of Classification Search
CPC ..... H04L 51/216; H04L 51/046; H04L 51/56; H04L 51/04
See application file for complete search history.

(56) References Cited

U.S. PATENT DOCUMENTS

| 5,236,199 A | 8/1993 | Thompson, Jr. |
| 5,400,248 A | 3/1995 | Chisholm |

(Continued)

FOREIGN PATENT DOCUMENTS

| CA | 2414397 | 8/2003 |
| EP | 3123442 | 2/2017 |

(Continued)

OTHER PUBLICATIONS

Unanimous A. I.; "What is Swarm Intelligence"; 2015; http://unu.ai/swarm-intelligence/; downloaded Oct. 6, 2016; 3 pages.
(Continued)

*Primary Examiner* — William G Trost, IV
*Assistant Examiner* — Adam A Cooney
(74) *Attorney, Agent, or Firm* — Fitch, Even, Tabin & Flannery LLP

(57) ABSTRACT

The present disclosure describes systems and methods for enabling real-time conversational dialog among a large population of networked human users while facilitating convergence on groupwise decisions, insights, and solutions, and amplifying collective intelligence. A collaboration server running a collaboration application is provided, wherein the collaboration server is in communication with the plurality of the networked computing devices and each computing device is associated with one user of the population of human participants. In some cases, the collaboration server defines a plurality of sub-groups of the population of human participants. A local chat application configured for displaying a conversational prompt received from the collaboration server is provided on each networked computing device. The local chat application enables real-time chat communication with other users of a sub-group assigned by the collaboration server. According to some embodiments, the computer mediated collaboration enables
(Continued)

through communication between the collaboration application and the local chat applications.

36 Claims, 11 Drawing Sheets

(51) Int. Cl.
*H04L 51/046* (2022.01)
*H04L 51/56* (2022.01)

(56) References Cited

U.S. PATENT DOCUMENTS

| | | |
|---|---|---|
| 5,808,908 A | 9/1998 | Ghahramani |
| 5,867,799 A | 2/1999 | Lang |
| 6,064,978 A | 5/2000 | Gardner |
| 6,480,210 B1 | 11/2002 | Martino |
| 6,606,615 B1 | 8/2003 | Jennings |
| 6,792,399 B1 | 9/2004 | Phillips |
| 6,903,723 B1 | 6/2005 | Forest |
| 6,944,596 B1 | 9/2005 | Gray |
| 7,031,842 B1 | 4/2006 | Musat |
| 7,040,982 B1 | 5/2006 | Jarvis |
| 7,155,510 B1 | 12/2006 | Kaplan |
| 7,158,112 B2 | 1/2007 | Rosenberg |
| 7,451,213 B2 | 11/2008 | Kaplan |
| 7,489,979 B2 | 2/2009 | Rosenberg |
| 7,542,816 B2 | 6/2009 | Rosenberg |
| 7,562,117 B2 | 7/2009 | Rosenberg |
| 7,603,414 B2 | 10/2009 | Rosenberg |
| 7,624,077 B2 | 11/2009 | Bonabeau |
| 7,653,726 B2 | 1/2010 | Kaplan |
| 7,690,991 B2 | 4/2010 | Black |
| 7,831,928 B1 | 11/2010 | Rose |
| 7,856,602 B2 | 12/2010 | Armstrong |
| 7,880,741 B2 | 2/2011 | Proebsting |
| 7,917,148 B2 | 3/2011 | Rosenberg |
| 7,937,285 B2 | 5/2011 | Goldberg |
| 7,958,006 B2 | 6/2011 | Keil |
| 8,176,101 B2 | 5/2012 | Rosenberg |
| 8,209,250 B2 | 6/2012 | Bradway |
| 8,229,824 B2 | 7/2012 | Berg |
| 8,250,071 B1 | 8/2012 | Killalea |
| 8,255,393 B1 | 8/2012 | Yu |
| 8,341,065 B2 | 12/2012 | Berg |
| 8,396,777 B1 | 3/2013 | Fine |
| 8,468,580 B1 | 6/2013 | Casey |
| 8,527,523 B1 | 9/2013 | Ravid |
| 8,583,470 B1 | 11/2013 | Fine |
| 8,589,488 B2 | 11/2013 | Huston |
| 8,612,331 B2 | 12/2013 | Hanson |
| 8,655,804 B2 | 2/2014 | Carrabis |
| 8,660,972 B1 | 2/2014 | Heidenreich |
| 8,676,735 B1 | 3/2014 | Heidenreich |
| 8,706,742 B1 | 4/2014 | Ravid |
| 8,745,104 B1 | 6/2014 | Rosenberg |
| 8,762,435 B1 | 6/2014 | Rosenberg |
| 8,814,660 B2 | 8/2014 | Thompson |
| 9,005,016 B2 | 4/2015 | Amaitis |
| 9,483,161 B2 | 11/2016 | Wenger |
| 9,710,836 B1 | 7/2017 | O'Malley |
| 9,772,759 B2 | 9/2017 | Hogan |
| 9,852,239 B2 | 12/2017 | Natarajan |
| 9,940,006 B2 | 4/2018 | Rosenberg |
| 9,947,174 B2 | 4/2018 | Rangarajan |
| 9,959,028 B2 | 5/2018 | Rosenberg |
| 10,110,664 B2 | 10/2018 | Rosenberg |
| 10,122,775 B2 | 11/2018 | Rosenberg |
| 10,133,460 B2 | 11/2018 | Rosenberg |
| 10,222,961 B2 | 3/2019 | Rosenberg |
| 10,277,645 B2 | 4/2019 | Rosenberg |
| 10,310,802 B2 | 6/2019 | Rosenberg |
| 10,332,412 B2 | 6/2019 | Swank |
| 10,353,551 B2 | 7/2019 | Rosenberg |
| 10,410,287 B2 | 9/2019 | Marsh |
| 10,416,666 B2 | 9/2019 | Rosenberg |
| 10,439,836 B2 | 10/2019 | Rosenberg |
| 10,515,516 B1 | 12/2019 | Eckman |
| 10,551,999 B2 * | 2/2020 | Rosenberg .......... G06F 3/04847 |
| 10,599,315 B2 | 3/2020 | Rosenberg |
| 10,606,463 B2 | 3/2020 | Rosenberg |
| 10,606,464 B2 | 3/2020 | Rosenberg |
| 10,609,124 B2 | 3/2020 | Rosenberg |
| 10,656,807 B2 | 5/2020 | Rosenberg |
| 10,712,929 B2 | 7/2020 | Rosenberg |
| 10,713,303 B2 | 7/2020 | Ashoori |
| 10,817,158 B2 | 10/2020 | Rosenberg |
| 10,817,159 B2 | 10/2020 | Willcox |
| 10,902,194 B2 | 1/2021 | Toronto |
| 10,992,700 B2 | 4/2021 | Stolarz |
| 11,037,400 B2 | 6/2021 | Cohen |
| 11,151,460 B2 | 10/2021 | Rosenberg |
| 11,269,502 B2 | 3/2022 | Rosenberg |
| 11,360,655 B2 | 6/2022 | Willcox |
| 11,360,656 B2 | 6/2022 | Rosenberg |
| 11,636,351 B2 | 4/2023 | Rosenberg |
| 11,769,164 B2 | 9/2023 | Rosenberg |
| 2001/0042010 A1 | 11/2001 | Hassell |
| 2002/0042920 A1 | 4/2002 | Thomas |
| 2002/0107726 A1 | 8/2002 | Torrance |
| 2002/0129106 A1 | 9/2002 | Gutfreund |
| 2002/0152110 A1 | 10/2002 | Stewart |
| 2002/0171690 A1 | 11/2002 | Fox |
| 2003/0023685 A1 | 1/2003 | Cousins |
| 2003/0033193 A1 | 2/2003 | Holloway |
| 2003/0065604 A1 | 4/2003 | Gatto |
| 2003/0079218 A1 | 4/2003 | Goldberg |
| 2003/0088458 A1 | 5/2003 | Afeyan |
| 2003/0100357 A1 | 5/2003 | Walker |
| 2003/0119579 A1 | 6/2003 | Walker |
| 2003/0208535 A1 * | 11/2003 | Appleman .......... G06F 16/986 |
| | | 707/E17.116 |
| 2003/0210227 A1 | 11/2003 | Smith |
| 2003/0227479 A1 | 12/2003 | Mizrahi |
| 2004/0015429 A1 | 1/2004 | Tighe |
| 2004/0064394 A1 | 4/2004 | Wallman |
| 2004/0210550 A1 | 10/2004 | Williams |
| 2005/0067493 A1 | 3/2005 | Urken |
| 2005/0075919 A1 | 4/2005 | Kim |
| 2005/0168489 A1 | 8/2005 | Ausbeck |
| 2005/0218601 A1 | 10/2005 | Capellan |
| 2005/0261953 A1 | 11/2005 | Malek |
| 2006/0010057 A1 | 1/2006 | Bradway |
| 2006/0147890 A1 | 7/2006 | Bradford |
| 2006/0200401 A1 | 9/2006 | Lisani |
| 2006/0204945 A1 | 9/2006 | Masuichi |
| 2006/0218179 A1 | 9/2006 | Gardner |
| 2006/0250357 A1 | 11/2006 | Safai |
| 2007/0011073 A1 | 1/2007 | Gardner |
| 2007/0039031 A1 | 2/2007 | Cansler |
| 2007/0055610 A1 | 3/2007 | Palestrant |
| 2007/0067211 A1 | 3/2007 | Kaplan |
| 2007/0072156 A1 | 3/2007 | Kaufman |
| 2007/0073606 A1 | 3/2007 | Lai |
| 2007/0078977 A1 | 4/2007 | Kaplan |
| 2007/0097150 A1 | 5/2007 | Ivashin |
| 2007/0099162 A1 | 5/2007 | Sekhar |
| 2007/0121843 A1 | 5/2007 | Atazky |
| 2007/0124503 A1 | 5/2007 | Ramos |
| 2007/0207479 A1 | 9/2007 | Wong |
| 2007/0208727 A1 | 9/2007 | Saklikar |
| 2007/0209069 A1 | 9/2007 | Saklikar |
| 2007/0211050 A1 | 9/2007 | Ohta |
| 2007/0216712 A1 | 9/2007 | Louch |
| 2007/0220100 A1 | 9/2007 | Rosenberg |
| 2007/0226296 A1 | 9/2007 | Lowrance |
| 2007/0294067 A1 | 12/2007 | West |
| 2008/0003559 A1 | 1/2008 | Toyama |
| 2008/0015115 A1 | 1/2008 | Guyot-Sionnest |
| 2008/0016463 A1 | 1/2008 | Marsden |
| 2008/0091777 A1 | 4/2008 | Carlos |
| 2008/0103877 A1 | 5/2008 | Gerken |
| 2008/0140477 A1 | 6/2008 | Tevanian |
| 2008/0140688 A1 | 6/2008 | Clayton |

(56) References Cited

U.S. PATENT DOCUMENTS

| | | |
|---|---|---|
| 2008/0189634 A1 | 8/2008 | Tevanian |
| 2008/0195459 A1 | 8/2008 | Stinski |
| 2009/0037355 A1 | 2/2009 | Brave |
| 2009/0063379 A1 | 3/2009 | Kelly |
| 2009/0063463 A1 | 3/2009 | Turner |
| 2009/0063991 A1 | 3/2009 | Baron |
| 2009/0063995 A1 | 3/2009 | Baron |
| 2009/0073174 A1 | 3/2009 | Berg |
| 2009/0076939 A1 | 3/2009 | Berg |
| 2009/0076974 A1 | 3/2009 | Berg |
| 2009/0125821 A1 | 5/2009 | Johnson |
| 2009/0170595 A1 | 7/2009 | Walker |
| 2009/0182624 A1 | 7/2009 | Koen |
| 2009/0239205 A1 | 9/2009 | Morgia |
| 2009/0254425 A1 | 10/2009 | Horowitz |
| 2009/0254836 A1 | 10/2009 | Bajrach |
| 2009/0287685 A1 | 11/2009 | Charnock |
| 2009/0325533 A1 | 12/2009 | Lele |
| 2010/0023857 A1 | 1/2010 | Mahesh |
| 2010/0083109 A1 | 4/2010 | Tse |
| 2010/0100204 A1 | 4/2010 | Ng |
| 2010/0144426 A1 | 6/2010 | Winner |
| 2010/0145715 A1 | 6/2010 | Cohen |
| 2010/0169144 A1 | 7/2010 | Estill |
| 2010/0174579 A1 | 7/2010 | Hughes |
| 2010/0199191 A1 | 8/2010 | Takahashi |
| 2010/0205541 A1 | 8/2010 | Rapaport |
| 2010/0299616 A1 | 11/2010 | Chen |
| 2011/0003627 A1 | 1/2011 | Nicely |
| 2011/0016137 A1 | 1/2011 | Goroshevsky |
| 2011/0080341 A1 | 4/2011 | Helmes |
| 2011/0087687 A1 | 4/2011 | Immaneni |
| 2011/0119048 A1 | 5/2011 | Shaw |
| 2011/0141027 A1 | 6/2011 | Ghassabian |
| 2011/0166916 A1 | 7/2011 | Inbar |
| 2011/0208328 A1 | 8/2011 | Cairns |
| 2011/0208684 A1 | 8/2011 | Dube |
| 2011/0208822 A1 | 8/2011 | Rathod |
| 2011/0276396 A1 | 11/2011 | Rathod |
| 2011/0288919 A1 | 11/2011 | Gross |
| 2011/0320536 A1 | 12/2011 | Lobb |
| 2012/0005131 A1 | 1/2012 | Horvitz |
| 2012/0011006 A1 | 1/2012 | Schultz |
| 2012/0013489 A1 | 1/2012 | Earl |
| 2012/0072843 A1 | 3/2012 | Durham |
| 2012/0079396 A1 | 3/2012 | Neer |
| 2012/0088220 A1 | 4/2012 | Feng |
| 2012/0088222 A1 | 4/2012 | Considine |
| 2012/0101933 A1 | 4/2012 | Hanson |
| 2012/0109883 A1 | 5/2012 | Iordanov |
| 2012/0110087 A1 | 5/2012 | Culver |
| 2012/0179567 A1 | 7/2012 | Soroca |
| 2012/0191774 A1 | 7/2012 | Bhaskaran |
| 2012/0290950 A1 | 11/2012 | Rapaport |
| 2012/0316962 A1 | 12/2012 | Rathod |
| 2012/0322540 A1 | 12/2012 | Shechtman |
| 2013/0013248 A1 | 1/2013 | Brugler |
| 2013/0019205 A1 | 1/2013 | Gil |
| 2013/0035981 A1 | 2/2013 | Brown |
| 2013/0035989 A1 | 2/2013 | Brown |
| 2013/0041720 A1 | 2/2013 | Spires |
| 2013/0097245 A1 | 4/2013 | Adarraga |
| 2013/0103692 A1 | 4/2013 | Raza |
| 2013/0132284 A1 | 5/2013 | Convertino |
| 2013/0150253 A1 | 6/2013 | Deciu |
| 2013/0160142 A1 | 6/2013 | Lai |
| 2013/0171594 A1 | 7/2013 | Gorman |
| 2013/0184039 A1 | 7/2013 | Steir |
| 2013/0191181 A1 | 7/2013 | Balestrieri |
| 2013/0191390 A1 | 7/2013 | Engel |
| 2013/0203506 A1 | 8/2013 | Brown |
| 2013/0231595 A1 | 9/2013 | Zoss |
| 2013/0254146 A1 | 9/2013 | Ellis |
| 2013/0298690 A1 | 11/2013 | Bond |
| 2013/0300740 A1 | 11/2013 | Snyder |
| 2013/0310260 A1 | 11/2013 | Kim |
| 2013/0311904 A1 | 11/2013 | Tien |
| 2013/0317966 A1 | 11/2013 | Bass |
| 2013/0339445 A1 | 12/2013 | Perincherry |
| 2014/0006042 A1 | 1/2014 | Keefe |
| 2014/0012780 A1 | 1/2014 | Sanders |
| 2014/0047356 A1 | 2/2014 | Ameller-Van-Baumberghen |
| 2014/0057240 A1 | 2/2014 | Colby |
| 2014/0074751 A1 | 3/2014 | Rocklitz |
| 2014/0075004 A1 | 3/2014 | Van Dusen |
| 2014/0087841 A1 | 3/2014 | Council |
| 2014/0089233 A1 | 3/2014 | Ellis |
| 2014/0089521 A1 | 3/2014 | Horowitz |
| 2014/0100924 A1 | 4/2014 | Ingenito |
| 2014/0108293 A1 | 4/2014 | Barrett |
| 2014/0108915 A1 | 4/2014 | Lu |
| 2014/0128162 A1 | 5/2014 | Arafat |
| 2014/0129946 A1 | 5/2014 | Harris |
| 2014/0155142 A1 | 6/2014 | Conroy |
| 2014/0162241 A1 | 6/2014 | Morgia |
| 2014/0171039 A1 | 6/2014 | Bjontegard |
| 2014/0214831 A1 | 7/2014 | Chi |
| 2014/0249689 A1 | 9/2014 | Bienkowski |
| 2014/0249889 A1 | 9/2014 | Park |
| 2014/0258970 A1 | 9/2014 | Brown |
| 2014/0278835 A1 | 9/2014 | Moseson |
| 2014/0279625 A1 | 9/2014 | Carter |
| 2014/0282586 A1 | 9/2014 | Shear |
| 2014/0310607 A1 | 10/2014 | Abraham |
| 2014/0316616 A1 | 10/2014 | Kugelmass |
| 2014/0337097 A1 | 11/2014 | Farlie |
| 2014/0351719 A1 | 11/2014 | Cattermole |
| 2014/0358825 A1 | 12/2014 | Phillipps |
| 2014/0379439 A1 | 12/2014 | Sekhar |
| 2015/0006492 A1 | 1/2015 | Wexler |
| 2015/0065214 A1 | 3/2015 | Olson |
| 2015/0089399 A1 | 3/2015 | Megill |
| 2015/0120619 A1 | 4/2015 | Baughman |
| 2015/0149932 A1 | 5/2015 | Yamada |
| 2015/0154557 A1 | 6/2015 | Skaaksrud |
| 2015/0156233 A1 | 6/2015 | Bergo |
| 2015/0170050 A1 | 6/2015 | Price |
| 2015/0192437 A1 | 7/2015 | Bouzas |
| 2015/0236866 A1* | 8/2015 | Colby ................ H04L 67/104 709/205 |
| 2015/0242755 A1 | 8/2015 | Gross |
| 2015/0242972 A1 | 8/2015 | Lemmey |
| 2015/0248817 A1 | 9/2015 | Steir |
| 2015/0262208 A1 | 9/2015 | Bjontegard |
| 2015/0294527 A1 | 10/2015 | Kolomiiets |
| 2015/0302308 A1 | 10/2015 | Bartek |
| 2015/0302309 A1 | 10/2015 | Bartek |
| 2015/0310687 A1 | 10/2015 | Morgia |
| 2015/0326625 A1 | 11/2015 | Rosenberg |
| 2015/0331601 A1 | 11/2015 | Rosenberg |
| 2015/0339020 A1 | 11/2015 | D Amore |
| 2015/0347903 A1 | 12/2015 | Saxena |
| 2015/0378587 A1 | 12/2015 | Falaki |
| 2016/0034305 A1 | 2/2016 | Shear |
| 2016/0044073 A1 | 2/2016 | Rosenberg |
| 2016/0048274 A1 | 2/2016 | Rosenberg |
| 2016/0055236 A1 | 2/2016 | Frank |
| 2016/0057182 A1 | 2/2016 | Rosenberg |
| 2016/0062735 A1 | 3/2016 | Wilber |
| 2016/0078458 A1 | 3/2016 | Gold |
| 2016/0082348 A1 | 3/2016 | Kehoe |
| 2016/0092989 A1 | 3/2016 | Marsh |
| 2016/0098778 A1 | 4/2016 | Blumenthal |
| 2016/0133095 A1 | 5/2016 | Shraibman |
| 2016/0154570 A1 | 6/2016 | Rosenberg |
| 2016/0170594 A1 | 6/2016 | Rosenberg |
| 2016/0170616 A1 | 6/2016 | Rosenberg |
| 2016/0189025 A1 | 6/2016 | Hayes |
| 2016/0209992 A1 | 7/2016 | Rosenberg |
| 2016/0210602 A1 | 7/2016 | Siddique |
| 2016/0274779 A9 | 9/2016 | Rosenberg |
| 2016/0277457 A9 | 9/2016 | Rosenberg |
| 2016/0284172 A1 | 9/2016 | Weast |
| 2016/0314527 A1 | 10/2016 | Rosenberg |

(56) References Cited

U.S. PATENT DOCUMENTS

| | | | |
|---|---|---|---|
| 2016/0320956 | A9 | 11/2016 | Rosenberg |
| 2016/0335647 | A1 | 11/2016 | Rebrovick |
| 2016/0349976 | A1 | 12/2016 | Lauer |
| 2016/0357418 | A1 | 12/2016 | Rosenberg |
| 2016/0366200 | A1 | 12/2016 | Healy |
| 2017/0083974 | A1 | 3/2017 | Guillen |
| 2017/0091633 | A1 | 3/2017 | Vemula |
| 2017/0223411 | A1 | 8/2017 | De Juan |
| 2017/0300198 | A1 | 10/2017 | Rosenberg |
| 2017/0337498 | A1 | 11/2017 | Rahimi |
| 2018/0076968 | A1 | 3/2018 | Rosenberg |
| 2018/0181117 | A1 | 6/2018 | Rosenberg |
| 2018/0196593 | A1 | 7/2018 | Rosenberg |
| 2018/0203580 | A1 | 7/2018 | Rosenberg |
| 2018/0204184 | A1 | 7/2018 | Rosenberg |
| 2018/0205676 | A1* | 7/2018 | Goyal ............... H04L 51/04 |
| 2018/0217745 | A1 | 8/2018 | Rosenberg |
| 2018/0239523 | A1 | 8/2018 | Rosenberg |
| 2018/0373991 | A1 | 12/2018 | Rosenberg |
| 2018/0375676 | A1 | 12/2018 | Bader-Natal |
| 2019/0006048 | A1 | 1/2019 | Gupta |
| 2019/0014170 | A1 | 1/2019 | Rosenberg |
| 2019/0034063 | A1 | 1/2019 | Rosenberg |
| 2019/0042081 | A1 | 2/2019 | Rosenberg |
| 2019/0066133 | A1 | 2/2019 | Cotton |
| 2019/0121529 | A1 | 4/2019 | Rosenberg |
| 2019/0212908 | A1 | 7/2019 | Willcox |
| 2020/0005341 | A1 | 1/2020 | Marsh |
| 2020/0019893 | A1 | 1/2020 | Lu |
| 2020/0250380 | A1 | 8/2020 | Wang |
| 2021/0004149 | A1 | 1/2021 | Willcox |
| 2021/0004150 | A1 | 1/2021 | Rosenberg |
| 2021/0136023 | A1* | 5/2021 | Chang ............... G06Q 50/20 |
| 2021/0150443 | A1 | 5/2021 | Shih |
| 2021/0209554 | A1 | 7/2021 | Hill |
| 2021/0241127 | A1 | 8/2021 | Rosenberg |
| 2021/0409354 | A1* | 12/2021 | Jang ............... H04L 67/306 |
| 2022/0147239 | A1 | 5/2022 | Rosenberg |
| 2022/0276774 | A1 | 9/2022 | Rosenberg |
| 2022/0276775 | A1 | 9/2022 | Willcox |
| 2023/0214675 | A1 | 7/2023 | Rosenberg |
| 2023/0236718 | A1 | 7/2023 | Rosenberg |

FOREIGN PATENT DOCUMENTS

| | | |
|---|---|---|
| EP | 3155584 | 4/2017 |
| EP | 3210386 | 8/2017 |
| GB | 2561458 | 10/2018 |
| JP | 2010191533 | 9/2010 |
| JP | 5293249 | 9/2013 |
| KR | 101273535 | 6/2013 |
| WO | 2011121275 | 10/2011 |
| WO | 2014023432 | 1/2014 |
| WO | 2014190351 | 11/2014 |
| WO | 2015148738 | 10/2015 |
| WO | 2015195492 | 12/2015 |
| WO | 2016064827 | 4/2016 |
| WO | 2017004475 | 1/2017 |
| WO | 2018006065 | 1/2018 |
| WO | 2018094105 | 5/2018 |

OTHER PUBLICATIONS

"Dialogr—A simple tool for collective thinking"; Mar. 25, 2015; http://www.dialogr.com./; 1 page.
Atanasov et al; "Distilling the Wisdom of Crowds: Prediction Markets vs. Prediction Polls"; Management Science, Articles in Advance; pp. 1-16; http://dx.doi.org/10.1287/mnsc.2015.2374; 2016 Informs (Year 2016).
Beni; "From Swarm Intelligence to Swarm Robotics"; Swarm Robotics WS 2004, LNCS 3342; pp. 1-9; 2005.
Combined Search and Examination Report under Sections 17 & 18(3) for GB2202778.3 issued by the GB Intellectual Property Office dated Mar. 10, 2022.
Cuthbertson; "Artificial Intelligence Turns $20 into $11,000 in Kentucky Derby Bet"; Newsweek Tech & Science; http://www.newsweek.com/artificial-intelligence-turns-20-11000-kentucky-derby-bet-457783; May 10, 2016; 9 pages.
Cuthbertson; "Oscar Predictions: AI Calculates Leonardo DiCaprio Will Finally Get His Oscar"; Newsweek Tech & Science; http://www.newsweek.com/oscar-predictions-artificial-intelligence-predicts-leo-will-finally-get-his-430712; Feb. 26, 2016; 3 pages.
Cuthbertson; "Swarm Intelligence: AI Algorithm Predicts the Future"; Newsweek Tech & Science; http://www.newsweek.com/swarm-intelligence-ai-algorithm-predicts-future-418707; Jan. 25, 2016; 4 pages.
Deck et al; "Prediction Markets in the Laboratory"; University of Arkansas and Chapman University; J. Econ. Surv., 2013; 33 pages.
Deneubourg et al; "Collective Patterns and Decision-Making"; Ethology Ecology & Evolution; Mar. 22, 1989; pp. 295-311.
Ding et al; "Time Weight Collaborative Filtering"; CIKM'05, Oct. 31-Nov. 5, 2005; Bremen, Germany; pp. 485-492.
EP; Extended European Search Report for EP Application No. 15767909.3 mailed from the European Patent Office dated Sep. 4, 2017.
EP; Extended European Search Report for EP Application No. 15808982.1 mailed from the European Patent Office dated Nov. 28, 2017.
EP; Extended European Search Report for EP Application No. 15852495.9 mailed from the European Patent Office dated Mar. 21, 2018.
Examination Report for Indian Patent Application No. 201747000968 mailed from the Indian Patent Office dated Nov. 4, 2020.
Examination Report under Section 18(3) for GB1805236.5 mailed from the Intellectual Property Office dated Jul. 30, 2021.
Examination Report under Section 18(3) for GB1805236.5 mailed from the Intellectual Property Office dated Apr. 1, 2021.
Examination Report under Section 18(3) for GB1805236.5 mailed from the Intellectual Property Office dated Mar. 24, 2022.
Gauchou et al; "Expression of Nonconscious Knowledge via Ideomotor Actions"; Consciousness and Cognition; Jul. 28, 2011; 9 pages.
Green; "Testing and Quantifying Collective Intelligence"; Collective Intelligence 2015; May 31, 2015; 4 pages.
Gurcay et al.; "The Power of Social Influence on Estimation Accuracy"; Journal of Behavioral Decision Making; J. Behav. Dec. Making (2014); Published online in Wiley Online Library (wileyonlinelibrary.com); DOI:10.1002/bdm.1843; 12 pages (Year: 2014).
Hanson et al; "Information Aggregation and Manipulation in an Experimental Market"; Interdisciplinary Center for Economic Science, George Mason University; Jul. 12, 2005; 15 pages.
Herkewitz; "Upvotes, Downvotes, and the Science of the Reddit Hivemind"; Aug. 8, 2013; http://www.popularmechanics.com/science/health/a9335/upvotes-downvotes-and-the-scien . . . ; downloaded Mar. 25, 2015; 10 pages.
International Search Report and Written Opinion of the International Searching Authority for PCT/US2015/022594 dated Jun. 29, 2015.
Malone et al; "Harnessing Crowds: Mapping the Genome of Collective Intelligence"; MIT Center for Collective Intelligence; Feb. 2009; 20 pages.
Mathematics Libre Texts; "3.3: Power Functions and Polynomial Functions"; Accessed on Oct. 8, 2021 at https://math.libretexts.org/Bookshelves/Precalculus/Precalculus_(OpenStax)/03%3A_Polynomial_and_Rational_Functions/3.03%3A_Power_Functions_and_Polynomial_Functions (Year:2021); 12 pages.
Meyer; "Meet Loomio, The Small-Scale Decision-Making Platform With The Biggest Ambitions"; Mar. 13, 2014; https://gigaom.com/2014/03/13/meet-loomio-the-small-scale-decision-making-platform-wi . . . ; downloaded Mar. 25, 2015; 11 pages.
PCT; International Search Report and Written Opinion of the International Searching Authority for PCT/US2015/035694 dated Aug. 28, 2015.

(56) References Cited

OTHER PUBLICATIONS

PCT; International Search Report and Written Opinion of the International Searching Authority for PCT/US2015/56394 dated Feb. 4, 2016.
PCT; International Search Report and Written Opinion of the International Searching Authority for PCT/US2016/040600 dated Nov. 29, 2016.
PCT; International Search Report and Written Opinion of the International Searching Authority for PCT/US2017/040480 dated Oct. 23, 2017.
PCT; International Search Report and Written Opinion of the International Searching Authority for PCT/US2017/062095 dated May 23, 2018.
Puleston et al.; "Predicting the Future: Primary Research Exploring the Science of Prediction"; Copyright Esomar 2014; 31 pages; (Year: 2014).
Quora; "What are Some Open Source Prediction Market Systems?"; retrieved from https://www.quora.com/What-are-some-Open-Source-Prediction-Market-systems; on Mar. 19, 2020 (Year: 2016).
Rand et al; "Dynamic Social Networks Promote Cooperation in Experiments with Humans"; PNAS; Nov. 29, 2011; vol. 108, No. 48; pp. 19193-19198.
Robertson; "After Success of Mob-Run 'Pokemon', Twitch Bets on Turning Viewers Into 'Torture Artists' Streaming Game Platform Helps Fund 'Choice Chamber', Where the Chat Window Sets the Challenges"; The Verge; Apr. 16, 2014; http://www.theverge.com/2014/4/16/5618334/twitch-streaming-platform-funds-viewer-con . . . ; downloaded Mar. 25, 2015; 4 pages.
Rosenberg et al; "Amplifying Prediction Accuracy Using Swarm A. I."; Intelligent Systems Conference 2017; Sep. 7, 2017; 5 pages.
Rosenberg et al; "Crowds vs. Swarms, A Comparison of Intelligence"; IEEE; Oct. 21, 2016; 4 pages.
Rosenberg; U.S. Appl. No. 17/024,580, filed Sep. 17, 2020.
Rosenberg; "Artificial Swarm Intelligence vs. Human Experts"; Neural Networks (IJCNN); 2016 International Joint Conference on IEEE; Jul. 24, 2016; 5 pages.
Rosenberg; "Artificial Swarm Intelligence, a human-in-the-loop approach to A. I."; Association for the Advancement of Artificial Intelligence; Feb. 12, 2016; 2 pages.
Rosenberg; "Human Swarming and The Future of Collective Intelligence"; Singularity WebLog; https://www.singularityweblog.com/human-swarming-and-the-future-of-collective-intelligence/; Jul. 19, 2015; 7 pages.
Rosenberg; "Human Swarming, a real-time method for Parallel Distributed Intelligence"; Proceedings of IEEE, 2015 Swarm/Human Blended Intelligence; Sep. 28, 2015; 7 pages.
Rosenberg; "Human Swarms Amplify Accuracy in Honesty Detection"; Collective Intelligence 2017; Jun. 15, 2017; 5 pages.
Rosenberg; "Human Swarms, A Real-Time Method for Collective Intelligence"; Proceedings of the European Conference on Artificial Life 2015; Jul. 20, 2015; pp. 658-659.
Rosenberg; "Monkey Room Book One"; Outland Pictures; Amazon ebook; Jan. 15, 2014; 39 pages.
Rosenberg; "Monkey Room Book Three"; Outland Pictures; Amazon ebook; Feb. 20, 2014; 22 pages.
Rosenberg; "Monkey Room Book Two"; Outland Pictures; Amazon ebook; Feb. 9, 2014; 27 pages.
Rosenberg; "Monkey Room"; Outland Pictures; Amazon; Mar. 30, 2014; 110 pages.
Rosenberg; "New Hope for Humans in an A. I. World"; TEDxKC—You Tube; Sep. 7, 2017; http://www.youtube.com/watch?v=Eu-RyZT_Uas.
Rosenberg; U.S. Appl. No. 18/367,089, filed Sep. 12, 2023.
Rosenberg; U.S. Appl. No. 14/668,970, filed Mar. 25, 2015.
Rosenberg; U.S. Appl. No. 14/708,038, filed May 8, 2015.
Rosenberg; U.S. Appl. No. 14/738,768, filed Jun. 12, 2015.
Rosenberg; U.S. Appl. No. 14/859,035, filed Sep. 18, 2015.
Rosenberg; U.S. Appl. No. 14/920,819, filed Oct. 22, 2015.
Rosenberg; U.S. Appl. No. 14/925,837, filed Oct. 28, 2015.
Rosenberg; U.S. Appl. No. 15/017,424, filed Feb. 5, 2016.
Rosenberg; U.S. Appl. No. 15/047,522, filed Feb. 18, 2016.
Rosenberg; U.S. Appl. No. 15/052,876, filed Feb. 25, 2016.
Rosenberg; U.S. Appl. No. 15/086,034, filed Mar. 30, 2016.
Rosenberg; U.S. Appl. No. 15/199,990, filed Jul. 1, 2016.
Rosenberg; U.S. Appl. No. 15/241,340, filed Aug. 19, 2016.
Rosenberg; U.S. Appl. No. 15/640,145, filed Jun. 30, 2017.
Rosenberg; U.S. Appl. No. 15/898,468, filed Feb. 17, 2018.
Rosenberg; U.S. Appl. No. 15/904,239, filed Feb. 23, 2018.
Rosenberg; U.S. Appl. No. 15/910,934, filed Mar. 2, 2018.
Rosenberg; U.S. Appl. No. 15/922,453, filed Mar. 15, 2018.
Rosenberg; U.S. Appl. No. 15/936,324, filed Mar. 26, 2018.
Rosenberg; U.S. Appl. No. 16/059,698, filed Aug. 9, 2018.
Rosenberg; U.S. Appl. No. 16/147,647, filed Sep. 29, 2018.
Rosenberg; U.S. Appl. No. 16/154,613, filed Oct. 8, 2018.
Rosenberg; U.S. Appl. No. 16/230,759, filed Dec. 21, 2018.
Rosenberg; U.S. Appl. No. 17/237,972, filed Apr. 22, 2023.
Rosenberg; U.S. Appl. No. 17/581,769, filed Jan. 21, 2022.
Rosenberg; U.S. Appl. No. 17/744,464, filed May 13, 2022.
Rosenberg; U.S. Appl. No. 18/114,954, filed Feb. 27, 2023.
Rosenberg; U.S. Appl. No. 18/194,056, filed Mar. 31, 2023.
Rosenberg: U.S. Appl. No. 15/959,080, filed Apr. 20, 2018.
Rosenberg: U.S. Appl. No. 15/815,579, filed Nov. 16, 2017.
Salminen; "Collective Intelligence in Humans: A Literature Review"; Lappeenranta University of Technology, Lahti School of Innovation; 1Proceedings; 2012; 8 pages.
Search and Examination Report under Sections 17 & 18(3) for Application No. GB1805236.5 issued by the UK Intellectual Property Office dated Jan. 28, 2022.
Search Report under Section 17 for GB2202778.3 issued by the GB Intellectual Property Office dated Mar. 4, 2022.
Souppouris; "Playing 'Pokemon' with 78,000 People is Frustratingly Fun"; The Verge; Feb. 17, 2014; http://www.theverge.com/2014/2/17/5418690/play-this-twitch-plays-pokemon-crowdsource . . . ; downloaded Mar. 25, 2015; 3 pages.
Stafford; "How the Ouija Board Really Moves"; BBC Future; Jul. 30, 2013; http://www.bbc.com/future/story/20130729-what-makes-the-ouija-board-move; downloaded Mar. 25, 2015; 5 pages.
Surowiecki; "The Wisdom of Crowds—Why the Many Are Smarter Than the Few and How Collective Wisdom Shapes Business, Economies, Societies, and Nations"; Business Book Review; vol. 21, No. 43; 2006; 10 pages.
Transforming Relationships; "Lottery: A tax on the statistically-challenged. "; Chapter 4, Sec 4.1; Accessed on Oct. 8, 2021 at http://www.henry.k12.ga.us/ugh/apstat/chaptemotes/sec4.1.html (Year:2021); 3 pages.
USPTO; Advisory Action issued in U.S. Appl. No. 17,581,769 dated May 22, 2023.
USPTO; Non-Final Office Action for U.S. Appl. No. 17/024,474 dated Oct. 12, 2021.
USPTO; Examiner Interview Summary for U.S. Appl. No. 15/086,034 dated Feb. 13, 2019.
USPTO; Examiner Interview Summary for U.S. Appl. No. 15/086,034 dated Jan. 9, 2019.
USPTO; Examiner Interview Summary for U.S. Appl. No. 16/059,698 dated Feb. 2, 2021.
USPTO; Final Office Action for U.S. Appl. No. 14/925,837 dated Aug. 7, 2019.
USPTO; Final Office Action for U.S. Appl. No. 15/086,034 dated Jul. 17, 2018.
USPTO; Final Office Action for U.S. Appl. No. 16/059,698 dated Dec. 31, 2020.
USPTO; Final Office Action issued in U.S. Appl. No. 17/581,769 dated Mar. 14, 2023.
USPTO; Non-Final Office Action for U.S. Appl. No. 14/738,768 dated Sep. 8, 2017.
USPTO; Non-Final Office Action for U.S. Appl. No. 17/024,580 dated Nov. 23, 2021.
USPTO; Non-Final Office Action for U.S. Appl. No. 15/047,522 dated Jan. 5, 2018.
USPTO; Non-Final Office Action for U.S. Appl. No. 14/708,038 dated Feb. 15, 2018.
USPTO; Non-Final Office Action for U.S. Appl. No. 14/859,035 dated Feb. 12, 2018.

(56) References Cited

OTHER PUBLICATIONS

USPTO; Non-Final Office Action for U.S. Appl. No. 14/920,819 dated Jun. 27, 2018.
USPTO; Non-Final Office Action for U.S. Appl. No. 14/925,837 dated Apr. 3, 2018.
USPTO; Non-Final Office Action for U.S. Appl. No. 15/017,424 dated Apr. 2, 2019.
USPTO; Non-Final Office Action for U.S. Appl. No. 15/052,876 dated Feb. 22, 2018.
USPTO; Non-Final Office Action for U.S. Appl. No. 15/086,034 dated Feb. 2, 2018.
USPTO; Non-Final Office Action for U.S. Appl. No. 15/199,990 dated Sep. 25, 2019.
USPTO; Non-Final Office Action for U.S. Appl. No. 15/241,340 dated Jul. 19, 2018.
USPTO; Non-Final Office Action for U.S. Appl. No. 15/898,468 dated Mar. 3, 2020.
USPTO; Non-Final Office Action for U.S. Appl. No. 15/910,934 dated Oct. 16, 2019.
USPTO; Non-Final Office Action for U.S. Appl. No. 15/922,453 dated Dec. 23, 2019.
USPTO; Non-Final Office Action for U.S. Appl. No. 15/936,324 dated Oct. 21, 2019.
USPTO; Non-Final Office Action for U.S. Appl. No. 15/959,080 dated Nov. 7, 2019.
USPTO; Non-Final Office Action for U.S. Appl. No. 16/059,698 dated Jun. 8, 2020.
USPTO; Non-Final Office Action for U.S. Appl. No. 16/130,990 dated Oct. 21, 2019.
USPTO; Non-Final Office Action for U.S. Appl. No. 16/147,647 dated Jan. 27, 2020.
USPTO; Non-Final Office Action for U.S. Appl. No. 16/154,613 dated Aug. 20, 2021.
USPTO; Non-Final Office Action for U.S. Appl. No. 16/230,759 dated Mar. 26, 2020.
USPTO; Non-Final Office Action for U.S. Appl. No. 16/668,970 dated Aug. 15, 2017.
USPTO; Non-Final Office Action for U.S. Appl. No. 17/237,972 dated Jun. 27, 2022.
USPTO; Non-Final Office Action for U.S. Appl. No. 17/581,769 dated Nov. 29, 2022.
USPTO; Notice of Allowance for U.S. Appl. No. 16/154,613 dated Nov. 3, 2021.
USPTO; Notice of Allowance for U.S. Appl. No. 16/130,990 dated Jan. 21, 2020.
USPTO; Notice of Allowance for U.S. Appl. No. 14/668,970 dated Feb. 8, 2018.
USPTO; Notice of Allowance for U.S. Appl. No. 14/738,768 dated Feb. 2, 2018.
USPTO; Notice of Allowance for U.S. Appl. No. 14/859,035 dated Aug. 23, 2018.
USPTO; Notice of Allowance for U.S. Appl. No. 14/920,819 dated Dec. 27, 2018.
USPTO; Notice of Allowance for U.S. Appl. No. 14/925,837 dated Nov. 7, 2019.
USPTO; Notice of Allowance for U.S. Appl. No. 15/959,080 dated Jan. 31, 2020.
USPTO; Notice of Allowance for U.S. Appl. No. 15/047,522 dated Aug. 30, 2018.
USPTO; Notice of Allowance for U.S. Appl. No. 15/052,876 dated Aug. 13, 2018.
USPTO; Notice of Allowance for U.S. Appl. No. 15/086,034 dated Mar. 5, 2019.
USPTO; Notice of Allowance for U.S. Appl. No. 15/241,340 dated Nov. 20, 2018.
USPTO; Notice of Allowance for U.S. Appl. No. 15/640,145 dated May 23, 2019.
USPTO; Notice of Allowance for U.S. Appl. No. 15/640,145 dated Nov. 15, 2018.
USPTO; Notice of Allowance for U.S. Appl. No. 15/815,579 dated Jul. 31, 2019.
USPTO; Notice of Allowance for U.S. Appl. No. 15/898,468 dated May 1, 2020.
USPTO; Notice of Allowance for U.S. Appl. No. 15/910,934 dated Jan. 15, 2020.
USPTO; Notice of Allowance for U.S. Appl. No. 15/936,324 dated Dec. 9, 2019.
USPTO; Notice of Allowance for U.S. Appl. No. 16/059,698 dated Mar. 15, 2021.
USPTO; Notice of Allowance for U.S. Appl. No. 16/147,647 dated Mar. 18, 2020.
USPTO; Notice of Allowance for U.S. Appl. No. 16/230,759 dated Jul. 17, 2020.
USPTO; Notice of Allowance for U.S. Appl. No. 16/356,777 dated Jul. 22, 2020.
USPTO; Notice of Allowance for U.S. Appl. No. 16/904,239 dated Jun. 17, 2019.
USPTO; Notice of Allowance for U.S. Appl. No. 17/024,580 dated Apr. 12, 2022.
USPTO; Notice of Allowance for U.S. Appl. No. 17/581,769 dated Jul. 18, 2023.
USPTO; Notice of Allowance for U.S. Appl. No. 17/744,479 dated Sep. 21, 2023.
USPTO; Notice of Allowance issued in U.S. Appl. No. 17/237,972 dated Jan. 18, 2023.
USPTO; Office Action for U.S. Appl. No. 14/708,038 dated Apr. 23, 2019.
USPTO; Restriction Requirement for U.S. Appl. No. 15/017,424 dated Oct. 2, 2018.
USPTO; Restriction Requirement for U.S. Appl. No. 15/199,990 dated Aug. 1, 2019.
USPTO: Notice of Allowance issued in U.S. Appl. No. 17/024,474 dated Apr. 11, 2022.
Wikipedia; "Swarm (simulation)"; Jul. 22, 2016; http://en.wikipedia.org/wiki/Swarm_(simulation); downloaded Oct. 6, 2016; 2 pages.
Wikipedia; "Swarm intelligence"; Aug. 31, 2016; http://en.wikipedia.org/wiki/Swarm_intelligence; downloaded Oct. 6, 2016; 8 pages.
Willcox; U.S. Appl. No. 16/356,777, filed Mar. 18, 2019.
Willcox; U.S. Appl. No. 17/024,474, filed Sep. 17, 2020.
Willcox; U.S. Appl. No. 17/744,479, filed May 13, 2022.
Yeung et al.; "Metacognition in human decision-making: confidence and error monitoring"; Philosophical Transactions of the Royal Society B; 2012; pp. 1310-1321.

\* cited by examiner

METHODS AND SYSTEMS FOR HYPERCHAT CONVERSATIONS AMONG LARGE NETWORKED POPULATIONS WITH COLLECTIVE INTELLIGENCE AMPLIFICATION

CROSS-REFERENCE TO RELATED APPLICATION

This application claims the benefit of U.S. Provisional Application No. 63/449,986, filed Mar. 4, 2023, for METHOD AND SYSTEM FOR "HYPERCHAT" CONVERSATIONS AMONG LARGE NETWORKED POPULATIONS WITH COLLECTIVE INTELLIGENCE AMPLIFICATION, which is incorporated in its entirety herein by reference.

U.S. Pat. No. 10,817,158 filed on Dec. 21, 2018, U.S. Pat. No. 11,360,656 filed on Sep. 17, 2020, and U.S. application Ser. No. 17/744,464 filed on May 13, 2022, the contents of are incorporated by reference herein in their entirety.

BACKGROUND

1. Technical Field

The present description relates generally to computer mediated collaboration, and more specifically to computer mediated collaboration via real-time distributed conversations over computer networks.

2. Discussion of the Related Art

Whether interactive human dialog is enabled through text, video, or VR, these tools are often used to enable networked teams and other distributed groups to hold real-time interactive coherent conversation, for example, deliberative conversations, debating issues and reaching decisions, setting priorities, or otherwise collaborating in real-time.

Unfortunately, real-time conversations become much less effective as the number of participants increases. Whether conducted through text, voice, video, or VR, it is very difficult to hold a coherent interactive conversation among groups that are larger than 12 to 15 people with some experts suggesting the ideal group size for interactive coherent conversation is 5 to 7 people. This has created a barrier to harnessing the collective intelligence of large groups through real-time interactive coherent conversation.

SUMMARY

The present disclosure describes systems and methods for enabling real-time conversational dialog among a large population of networked individuals, while facilitating convergence on groupwise decisions, insights and solutions. Embodiments of the disclosure include dividing a large user population into a plurality of smaller subgroups that are each suitable sized to enable coherent real-time deliberative conversations among its members in parallel with other subgroups. In preferred embodiments, an artificial intelligence agent performs an exchange of conversational content among subgroups to facilitate the propagation of conversational content across the population, to amplify the collective intelligence across all members, and enable the output of valuable insights generated across the subgroups.

A method, apparatus, non-transitory computer readable medium, and system for computer mediated collaboration for distributed conversations are described. One or more aspects of the method, apparatus, non-transitory computer readable medium, and system include providing a collaboration server running a collaboration application, the collaboration server in communication with the plurality of networked computing devices, each computing device associated with one member of the population of human participants, the collaboration server defining a plurality of sub-groups of the population of human participants, the collaboration server comprising: providing a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group; and enabling through communication between the collaboration application running on the collaboration server and the local chat applications running on each of the plurality of networked computing devices.

According to some embodiments, the enabling of through conversation comprises the following steps: at step (a), sending the conversational prompt to the plurality of networked computing devices, the conversational prompt comprising a question to be collaboratively discussed by the population of human participants; at step (b), presenting, substantially simultaneously, a representation of the conversational prompt to each member of the population of human participants on a display of the computing device associated with that member; at step (c), dividing the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants; at step (d), collecting and storing a first conversational dialogue in a first memory portion at the collaboration server from members of the population of human participants in the first sub-group during an interval via a user interface on the computing device associated with each member of the population of human participants in the first sub-group; at step (e), collecting and storing a second conversational dialogue in a second memory portion at the collaboration server from members of the population of human participants in the second sub-group during the interval via a user interface on the computing device associated with each member of the population of human participants in the second sub-group; at step (f), collecting and storing a third conversational dialogue in a third memory portion at the collaboration server from members of the population of human participants in the third sub-group during the interval via a user interface on the computing device associated with each member of the population of human participants in the third sub-group; at step (g), processing the first conversational dialogue at the collaboration server using a large language model to express a first conversational summary in conversational form; at step (h), processing the second conversational dialogue at the collaboration server using the large language model to express a second conversational summary in conversational form; at step (i), processing the third conversational dialogue at the collaboration server using the large language model to express a third conversational summary in conversational form; at step (j), sending the first conversational summary expressed in conversational form to each of the members of a first different sub-group, wherein the first different sub-group is not the first sub-group; at step (k), sending the second conversational summary expressed in conversational form to each of the members of a second different sub-group, wherein the second different sub-group is not the second sub-group; at step (l), sending the third conversational summary expressed in conversational form to each of the members of a third different sub-group, wherein the third different sub-group is not the third sub-group; and, at step (m), repeating steps (d) through (l) at least one time.

DETAILED DESCRIPTION

Figure 1:
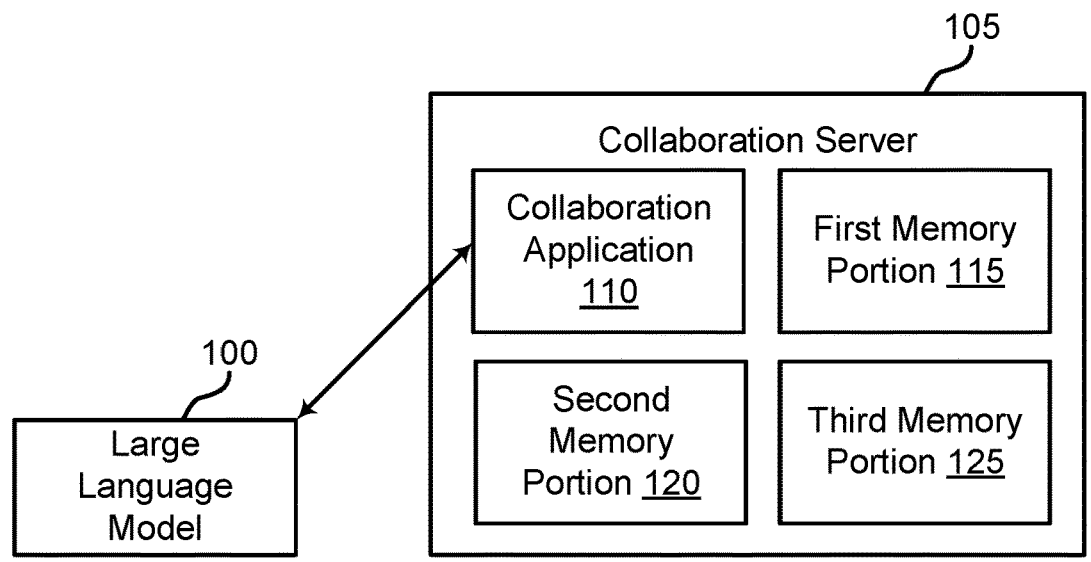
FIG. 1 shows an example of a collaboration system according to aspects of the present disclosure.
Figure 1:
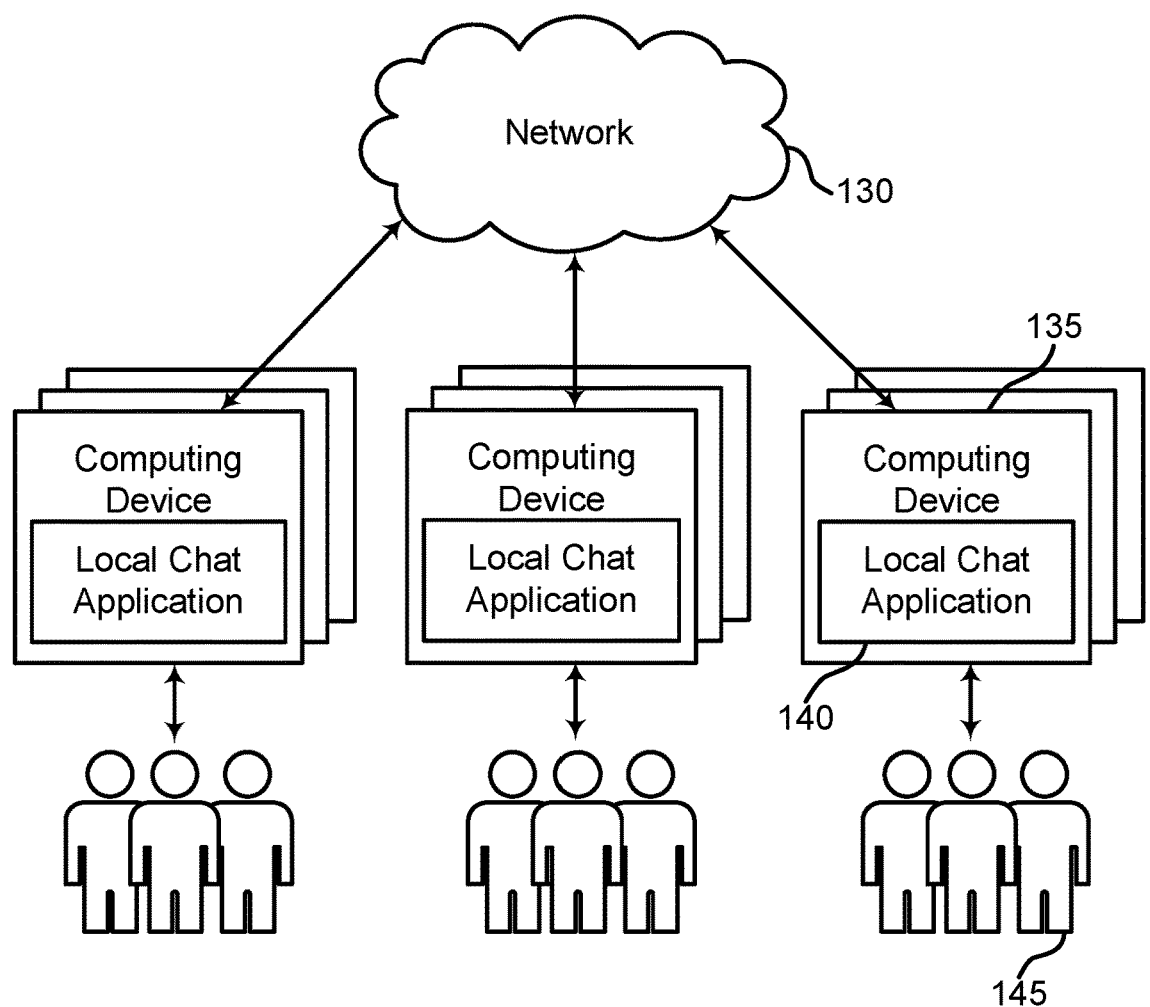

Networking technologies enable groups of distributed individuals to hold real-time conversations online through text chat, voice chat, video chat, or VR chat.

In the field of Collective Intelligence, research has shown that more accurate decisions, priorities, insights, and forecasts can be generated by aggregating the input of very large groups.

However, there is a significant need for inventive interactive solutions that can enable real-time deliberative conversations among large groups of networked users via text, voice, video, or virtual avatars. For example, enabling groups as large as 50, 500, and 5000 distributed users to engage in coherent and meaningful real-time deliberative conversations would have significant collaborative benefits for large human teams and organizations, including the ability to amplify their collective intelligence.

The present disclosure describes systems and methods to enable real-time conversations via text, voice, video, and immersive avatars, among large populations of networked users. In preferred embodiments, the conversations are enabled by dividing the population into a plurality of manageably sized subgroups in which users can hold coherent groupwise conversations in parallel with other subgroups, while also enabling information to propagate across the larger population by exchanging conversational content between subgroups with the support of AI agents, as described in more detail herein. Embodiments of the present disclosure provide computational architectures that enable information to propagate efficiently across populations, as well as enable subgroups to benefit from the insights of other subgroups during their real-time conversations. Moreover, the unique systems and techniques described herein amplify the collective intelligence of the population and output valuable insights across subgroups.

One or more embodiments of the present disclosure include three AI agents (e.g., a Conversational Observer Agent, a Conversational Surrogate Agent, and a Global Collective Intelligence Agent). The three agents are described herein based on the functions performed in the present disclosure (e.g., not because they need to be separate pieces of software that run independently). In some examples, the agents may be implemented on the same server using a same code base. In some cases, the three agents can be designed and implemented using an application programming interface (API) that accesses a Foundational Model that has Large Language Model (LLM) features and functions (e.g., such as generative pre-trained transformers (GPTs), including GPT-3 from Open AI and/or ChatGPT from Open AI, etc.).

Conventional chat technology is not effective for enabling large groups of users engage in coherent real-time conversations and reach deliberative conclusions because it is untenable if a large group (e.g., 50 people) are trying to speak in one conversation. In some aspects, the high-level concept of dividing a large population into subgroups and enabling certain types of "informational overlap" is a basis for a "hyper-swarm" concept (e.g., as disclosed by prior applications which are incorporated by reference herein). The previously disclosed "hyper-swarm" applications expressed difficulty in using the techniques for real-time text or voice conversations.

For example, having 1000 people participate in a chat room to debate issues may be impractical and ineffective, as conventional chat technologies are not able to enable coherent groupwise deliberations in large networked groups. Therefore, according to embodiments of the present disclosure, real-time participants may be divided into subgroups. Each sub-group may include, or refer to, a unique distribution of people that are overlapping (e.g., a group of 1000 people can have a single conversation where ideas propagate throughout the full population, but each individual interacts with a small subset of the population which is selected as a manageable number for real-time conversation).

In some aspects, it may be challenging to extend such systems to voice or video chat among subgroups with overlapping distributions of people. For instance, in voice implementations, handling of timing aspects are important and there may be multiple people talking at the same time (e.g., because they are not in the same subgroup as each other). Thus, as described in more detail herein, a conversational buffering method using memory and AI agents may be employed to avoid overlap in time or to moderate turn-taking as conversational information is exchanged among real-time parallel subgroups.

The following description is not to be taken in a limiting sense, but is made merely for the purpose of describing the general principles of the exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present description. Thus, appearances of the phrases "in one embodiment," "in an embodiment," and similar language throughout this specification may, but do not necessarily, all refer to the same embodiment.

Furthermore, the described features, structures, or characteristics of the description may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the description. One skilled in the relevant art will recognize, however, that the teachings of the present description can be practiced without one or more of the specific details, or with other methods, components, materials, and so forth. In other instances, well-known structures, materials, or operations are not shown or described in detail to avoid obscuring aspects of the description.

A Collaboration System

As disclosed herein, the HyperChat system enables a large population of distributed users to engage in a real-time conversation such that (a) individual users only engage with a small number of other participants referred to herein as a sub-group, thereby enabling coherent and manageable conversations in online environments, and (b) the present disclosure enables conversational information to be exchanged from sub-group to subgroups and thus propagate across the population, thereby enabling members of individual sub-groups to benefit from the knowledge, wisdom, insights, and intuitions of other sub-groups and enabling the full population to gradually converge on collaborative insights that leverage the collective intelligence of the large population. Additionally, methods and systems are disclosed for outputting the collaborative insights of the larger population, thereby enabling the group (or some other entity) from benefiting from the collective intelligence of the population.

FIG. 1 shows an example of a collaboration system according to aspects of the present disclosure. The example shown includes large language model 100, collaboration server 105, network 130, a plurality of computing devices 135, and a plurality of individual users 145.

In an example, a large group of users 145 enter the collaboration system. As an example shown in FIG. 1, 9 users may enter the system. However, embodiments are not limited thereto, and large group of users (e.g., 100 or 500 or 5000 users) may enter the system. In some examples, the collaboration server 105 divides 100 users into sub-groups (e.g., 20 sub-groups of 5 users each for 100 users). User 145 is an example of, or includes aspects of, the corresponding element described with reference to FIGS. 2-6.

Each user experiences a traditional chat room with four other users. The user sees the names of the four other users in the sub-group. The collaboration server 105 mediates a conversation with the five users and ensures that the users see the comments from each other. Thus, each user participates in a real-time conversation with the remaining four users in the chat room (i.e., sub-group). According to the example, the collaboration server 105 performs the process parallelly with the 19 other sub-groups. However, the users are not able to see the conversations happening in the 19 other chat rooms.

According to some aspects, collaboration server 105 performs a collaboration application 110, i.e., the collaboration server 105 uses collaboration application 110 for communication with the set of the networked computing devices 135, and each computing device 135 is associated with one member of the population of human participants. Additionally, the collaboration server 105 defines a set of sub-groups of the population of human participants. Collaboration server 105 is an example of, or includes aspects of, the corresponding element described with reference to FIGS. 2 and 10.

In some cases, the collaboration server 105 keeps track of the chat conversations separately in a memory. The memory in the collaboration server 105 includes a first memory portion 115, a second memory portion 120, and a third memory portion 125. First memory portion 115, second memory portion 120, and third memory portion 125 are examples of, or include aspects of, the corresponding element described with reference to FIG. 10.

The collaboration server 105 keeps track of the chat conversations separately so that the chat conversations can be separated from each other. The collaboration server 105 periodically sends chunks of each separate chat conversation to a Large Language Model 100 (LLM, for example, ChatGPT from OpenAI) via an Application Programming Interface (API) for processing and receives a summary from the LLM 100 that is associated with the particular sub-group. The collaboration server 105 keeps track of each conversation (via the software observer agent) and generates summaries using the LLM (via API calls).

According to some aspects, large language model 100 processes the first conversational summary, the second conversational summary, and the third conversational summary using the large language model 100 to generate a global conversational summary expressed in conversational form. In some examples, large language model 100 sends the global conversational summary expressed in conversational form to each of the members of the first sub-group, the second sub-group, and the third sub-group. Large language model 100 is an example of, or includes aspects of, the corresponding element described with reference to FIG. 2.

The collaboration server 105 coordinates information exchange between the separate sub-groups (i.e., between the separate conversations happening parallelly in separate chat rooms). The information exchange is performed by sending a conversational representation of the summary generated for a given chat room of a given sub-group into another chat room of another sub-group.

Computing device 135 is an example of, or includes aspects of, the corresponding element described with reference to FIGS. 2, 5, 6, and 11. In one aspect, computing device 135 includes local chat application 140. According to some aspects, a local chat application 140 is provided on each networked computing device 135. Network 130 facilitates the transfer of information between each of the plurality of computing devices 135 and collaboration server 105. Network 130 may be referred to as a "cloud".

A cloud is a computer network configured to provide on-demand availability of computer system resources, such as data storage and computing power. In some examples, the cloud provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, a cloud is limited to a single organization. In other examples, the cloud is available to many organizations. In one example, a cloud includes a multi-layer communications network comprising multiple edge routers and core routers. In another example, a cloud is based on a local collection of switches in a single physical location.

The local chat application 140 is configured for displaying a conversational prompt received from the collaboration server 105 (based on network 130 and computing device 135), and for enabling real-time chat communication of a user with other users in a sub-group assigned by the collaboration server 105, the real-time chat communication including sending chat input collected from the one user associated with the networked computing device 135 and other users of the assigned sub-group. Local chat application 140 is an example of, or includes aspects of, the corresponding element described with reference to FIGS. 2 and 11.

Figure 2:
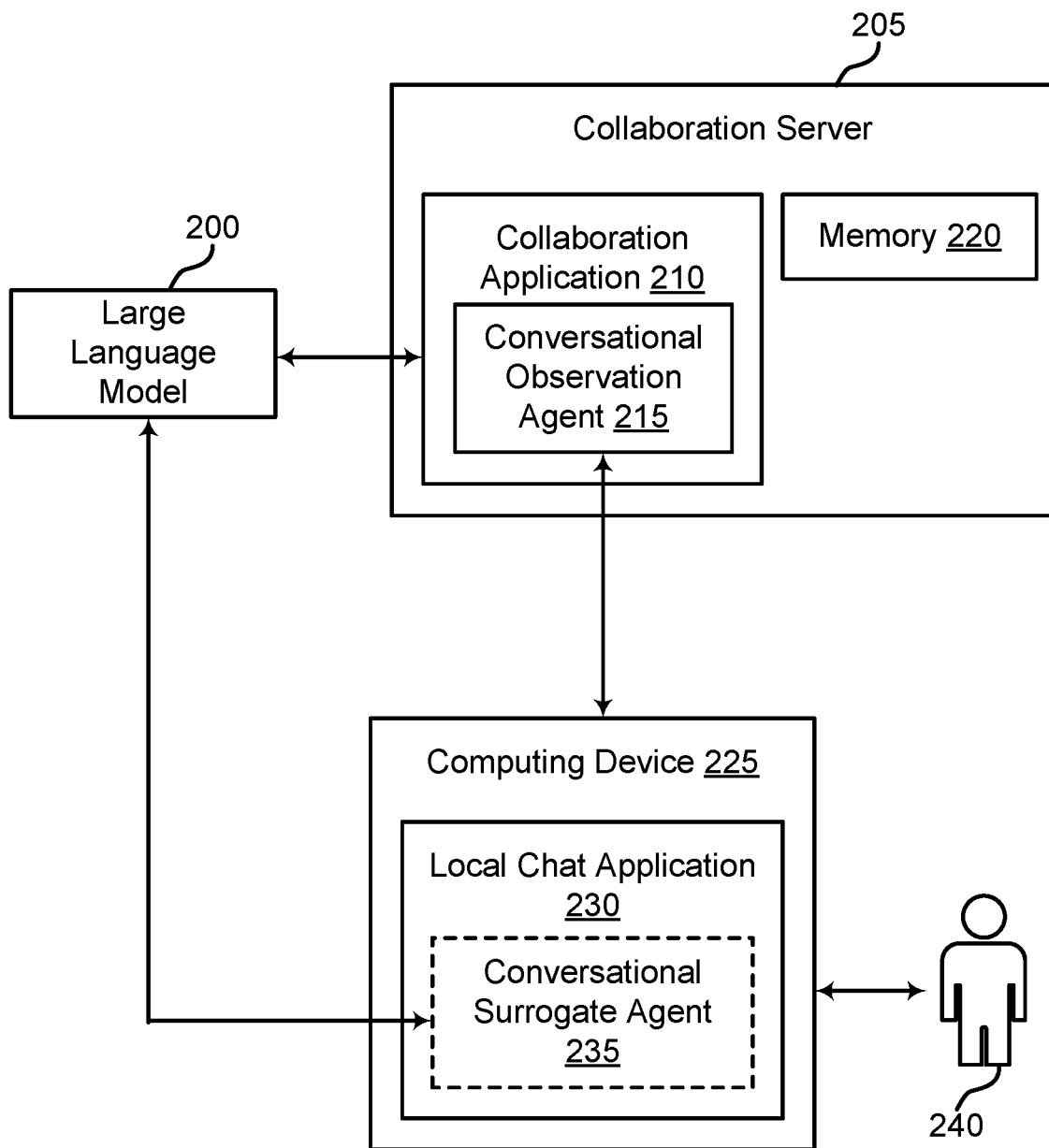
FIG. 2 shows an example of a collaboration process according to aspects of the present disclosure.

FIG. 2 shows an example of a collaboration process according to aspects of the present disclosure. The example shown includes large language model 200, collaboration server 205, computing device 225, and user 240.

In some cases, large language model (LLM) 200 is able to identify unique chat messages within complex blocks of dialog while assessing or identifying responses that refer to a particular point. In some cases, LLM 200 can capture the flow of the conversation (e.g., the speakers, content of the conversation, other speakers who disagreed, agreed, or argued, etc.) from the block dialog. In some cases, LLM 200 can provide the conversational context, e.g., blocks of dialog that capture the order and timing in which the chat responses flow. Large language model 200 is an example of, or includes aspects of, the corresponding element described with reference to FIG. 1.

Collaboration server 205 is an example of, or includes aspects of, the corresponding element described with reference to FIGS. 1 and 10. In one aspect, collaboration server 205 includes collaboration application 210 and memory 220. In one aspect, as shown in FIG. 1, collaboration server 105 includes collaboration application 110, first memory portion 115, second memory portion 120, and third memory portion 125. Memory 220 is an example of, or includes aspects of, the corresponding element described with reference to FIGS. 1, 3, 10, and 11.

In one aspect, collaboration application 210 includes conversational observation agent 215. In some cases, conversational observation agent 215 is an artificial intelligence (AI)-based model that observes the real-time conversational content within one or more of the sub-groups and passes a representation of the information between the sub-groups to not lose the benefit of the broad knowledge and insight across the full population. In some cases, conversational observation agent 215 keeps track of each conversation separately and sends chat conversation chunks (via an API) to LLM 200 for processing (e.g., summarization). Collaboration application 210 is an example of, or includes aspects of, the corresponding element described with reference to FIGS. 1 and 10. Conversational observation agent 215 is an example of, or includes aspects of, the corresponding element described with reference to FIGS. 3, 4, and 10.

Computing device 225 is a networked computing device that facilitates the transfer of information between local chat application 230 and collaboration server 205. Computing device 225 is an example of, or includes aspects of, the corresponding element described with reference to FIGS. 1, 5, 6, and 11. In one aspect, computing device 225 includes local chat application 230.

The local chat application 230 is configured to display a conversational prompt received from the collaboration server 105 (via network 130 described with reference to FIG. 1 and computing device 225), and to enable real-time chat communication with other users of a sub-group assigned by the collaboration server 205, the real-time chat communication including sending text chat input collected from the one user associated with the computing device 225 to other users of the assigned sub-group, and vice versa. In some aspects, the real-time chat communication may be referred to as a conversational dialogue.

In some aspects, a first conversational dialogue, a second conversational dialogue and a third conversational dialogue from the plurality of sub-groups each include a set of ordered chat messages including text. In some aspects, the first conversational dialogue, the second conversational dialogue, and the third conversational dialogue each further include a respective member identifier for the member of the population of human participants who entered each chat message. In some aspects, the first conversational dialogue, the second conversational dialogue and the third conversational dialogue each further includes a respective timestamp identifier for a time of day when each chat message is entered.

In some aspects, the first unique portion of the population (i.e. a first sub-group) consists of no more than ten users of the population of human participants, the second unique portion consists of no more than ten users of the population of human participants, and the third unique portion consists of no more than ten users of the population of human participants. In some aspects, the first conversational dialogue includes chat messages including voice. In some aspects, the voice includes words spoken, and at least one spoken language component selected from the group of spoken language components consisting of tone, pitch, rhythm, volume and pauses. In some aspects, the first conversational dialogue includes chat messages including video. In some aspects, the video includes words spoken, and at least one language component selected from the group of language components consisting of tone, pitch, rhythm, volume, pauses, facial expressions, gestures, and body language. Local chat application 230 is an example of, or includes aspects of, the corresponding element described with reference to FIGS. 1 and 11.

In one aspect, local chat application 230 includes conversational surrogate agent 235. According to some embodiments, each of the plurality of sub-groups include a conversational surrogate agent. In some aspects, conversational surrogate agent 235 is a simulated (i.e., fake) user in each sub-group that conversationally expresses a representation of the information contained in the summary from a different sub-group. Conversational surrogate agent 235 is an example of, or includes aspects of, the corresponding element described with reference to FIGS. 4 and 11.

Accordingly, apparatus, system, and method for computer mediated collaboration for distributed conversations is described. For instance, one or more aspects of the apparatus, system, and method include a collaboration server running a collaboration application, the collaboration server in communication with the plurality of the networked computing devices, each computing device associated with one member of the population of human participants, the collaboration server defining a plurality of sub-groups of the population of human participants, the collaboration server comprising: a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group and vice versa; and software components executed by the collaboration server and the local chat application for enabling through communication between the collaboration application running on the collaboration server and the local chat applications running on each of the plurality of networked computing devices.

According to some aspects, enabling through communication includes: at step (a), sending the conversational prompt to the plurality of networked computing devices, the conversational prompt comprising a question, issue, or topic to be collaboratively discussed by the population of human participants; at step (b), presenting, substantially simultaneously, a representation of the conversational prompt to each member of the population of human participants on a display of the computing device associated with that member; at step (c), dividing the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants; at step (d), collecting and storing a first conversational dialogue in a first memory portion at the collaboration server from members of the population of human participants in the first sub-group during an interval via a user interface on the computing device associated with each member of the population of human participants in the first sub-group; at step (e), collecting and storing a second conversational dialogue in a second memory portion at the collaboration server from members of the population of human participants in the second sub-group during the interval via a user interface on the computing device associated with each member of the population of human participants in the second sub-group; at step (f), collecting and storing a third conversational dialogue in a third memory portion at the collaboration server from members of the population of human participants in the third sub-group during the interval via a user interface on the computing device associated with each member of the population of human participants in the third sub-group; at step (g), processing the first conversational dialogue at the collaboration server using a large language model to express a first conversational summary in conversational form; at step (h), processing the second conversational dialogue at the collaboration server using the large language model to express a second conversational summary in conversational form; at step (i), processing the third conversational dialogue at the collaboration server using the large language model to express a third conversational summary in conversational form; at step (j), sending the first conversational summary expressed in conversational form to each of the members of a first different sub-group, wherein the first different sub-group is not the first sub-group; at step (k), sending the second conversational summary expressed in conversational form to each of the members of a second different sub-group, wherein the second different sub-group is not the second sub-group; at step (l), sending the third conversational summary expressed in conversational form to each of the members of a third different sub-group, wherein the third different sub-group is not the third sub-group; and, at step (m), repeating steps (d) through (l) at least one time. Note—in many preferred embodiments, step (c), which involves dividing the population into a plurality of subgroups can be performed before steps (a) and (b).

Some examples of the apparatus, system, and method further include sending the first conversational summary expressed in conversational form to each of the members of a first different sub-group expressed in first person as if the first conversational summary were coming from an additional member (simulated) of the first different sub-group of the population of human participants. Some examples further include sending the second conversational summary expressed in conversational form to each of the members of a second different sub-group expressed in first person as if the second conversational summary were coming from an additional member (simulated) of the second different sub-group of the population of human participants. Some examples further include sending the third conversational summary expressed in conversational form to each of the members of a third different sub-group expressed in first person as if the third conversational summary were coming from an additional member (simulated) of the third different sub-group of the population of human participants. In some such embodiment, the additional simulated member is given is assigned a unique username that appears similarly in the Local Chat Application as the usernames of the human members of the sub-group. In this way, the users within a sub-group are made to feel like they are holding a natural real-time conversation among participants in their sub-group, that subset including a simulated member that express in the first person, unique points that represents conversational information captured from another sub-group. With every sub-group having such a simulated member, information propagates smoothly across the population, linking all the subgroups into a single unified conversation.

Some examples of the apparatus, system, and method further include processing the first conversational summary, the second conversational summary, and the third conversational summary using the large language model to generate a global conversational summary expressed in conversational form.

Some examples of the apparatus, system, and method further include sending the global conversational summary expressed in conversational form to each of the members of the first sub-group, the second sub-group, and the third sub-group.

In some aspects, the generating of a final global conversational summary includes weighting more recent ones of the global conversational summaries more heavily than less recent ones of the global conversational summaries.

In some aspects, the first conversational dialogue, the second conversational dialogue and the third conversational dialogue each comprise a set of ordered chat messages comprising text. In some aspects, the first conversational dialogue, the second conversational dialogue and the third conversational dialogue each further comprise a respective member identifier for the member of the population of human participants who entered each chat message. In some aspects, the first conversational dialogue, the second conversational dialogue and the third conversational dialogue each further comprises a respective timestamp identifier for a time of day when each chat message is entered.

In some aspects, the processing of the first conversational dialogue in step (g) further comprises determining a respective response target indicator for each chat message entered by the first sub-group, wherein the respective response target indicator provides an indication of a prior chat message to which each chat message is responding. In some aspects, the processing of the second conversational dialogue in step (h) further comprises determining a respective response target indicator for each chat message entered by the second sub-group, wherein the respective response target indicator provides an indication of a prior chat message to which each chat message is responding. In some aspects, the processing of the third conversational dialogue in step (i) further comprises determining a respective response target indicator for each chat message entered by the third sub-group, wherein the respective response target indicator provides an indication of a prior chat message to which each chat message is responding.

In some aspects, the processing the first conversational dialogue in step (g) further comprises determining a respective sentiment indicator for each chat message entered by the first sub-group, wherein the respective sentiment indicator provides an indication of whether each chat message is in agreement or disagreement with prior chat messages. In some aspects, the processing the second conversational dialogue in step (h) further comprises determining a respective sentiment indicator for each chat message entered by the second sub-group, wherein the respective sentiment indicator provides an indication of whether each chat message is in agreement or disagreement with prior chat messages. In some aspects, the processing the third conversational dialogue in step (i) further comprises determining a respective sentiment indicator for each chat message entered by the third sub-group, wherein the respective sentiment indicator provides an indication of whether each chat message is in agreement or disagreement with prior chat messages.

In some aspects, the processing the first conversational dialogue in step (g) further comprises determining a respective conviction indicator for each chat message entered by the first sub-group, wherein the respective conviction indicator provides an indication of conviction for each chat message. In some aspects, the processing the second conversational dialogue in step (h) further comprises determining a respective conviction indicator for each chat message entered by the second sub-group, wherein the respective conviction indicator provides an indication of conviction for each chat message. In some aspects, the processing the third conversational dialogue in step (i) further comprises determining a respective conviction indicator for each chat message entered by the third sub-group, wherein the respective conviction indicator provides an indication of conviction each chat message is in the expressions of the chat message.

In some aspects, the first unique portion consists of no more than ten members of the population of human participants, the second unique portion consists of no more than ten members of the population of human participants, and the third unique portion consists of no more than ten members of the population of human participants.

In some aspects, the first conversational dialogue comprises chat messages comprising voice (i.e., real-time verbal content expressed during a conversation by a user 145 and captured by a microphone associated with their computing device 135). In some aspects, the voice includes words spoken, and at least one spoken language component selected from the group of spoken language components consisting of tone, pitch, rhythm, volume and pauses. In some embodiments, the verbal content is converted into textual content (by well-known speech to text methods) prior to transmission to the collaboration server 145.

In some aspects, the first conversational dialogue comprises chat messages comprising video (i.e., real-time verbal content expressed during a conversation by a user 145 and captured by a camera and microphone associated with their computing device 135). In some aspects, the video includes words spoken, and at least one language component selected from the group of language components consisting of tone, pitch, rhythm, volume, pauses, facial expressions, gestures, and body language.

In some aspects, each of the repeating steps occurs after expiration of an interval. In some aspects, the interval is a time interval. In some aspects, the intervals are a number of conversational interactions.

In some aspects, the first different sub-group is the second sub-group, and the second different sub-group is the third sub-group. In some aspects, the first different sub-group is a first randomly selected sub-group, the second different sub-group is a second randomly selected sub-group, and the third different sub-group is a third randomly selected sub-group, wherein the first randomly selected sub-group, the second randomly selected sub-group and the third randomly selected sub-group are not the same sub-group.

A HyperChat Process

Embodiments of the present disclosure include a collaboration server that can divide a large group of people into small sub-groups. In some examples, the server can divide a large population (72 people) into 12 sub-groups of 6 people each, thereby enabling each sub-group's users to chat among themselves. The server can inject conversational prompts into the sub-groups in parallel such that the members are talking about the same issue, topic, or question. At various intervals, the server captures blocks of dialog from each sub-group, sends it to a Large Language Model (LLM) via an API that summarizes and analyzes the blocks (using an Observer Agent for each sub-group), and then sends a representation of the summaries into other sub-groups. In some cases, the server expresses the summaries blocks as first-person dialogue that is part of the naturally flowing conversation (e.g., using a surrogate agent for each sub-group). Accordingly, the server enables 72 people to hold a real-time conversation on the same topic while providing for each person to be part of a small sub-group that can communicate conveniently and simultaneously has conversational information passed between sub-groups in the form of the summarized blocks of dialogue. Hence, conversational content propagates across the large population (i.e., each of the sub-groups) that provides for the large population to converge on conversational conclusions.

A global conversational summary is optionally generated after the sub-groups hold parallel conversations for some time with informational summaries passed between sub-groups. A representation of the global conversational summary is optionally injected into the sub-groups via the surrogate AI agent associated with that sub-group. As a consequence of the propagation of local conversational content across sub-groups and the optional injection of global conversational content into all sub-groups, the large population is enabled to hold a single unified deliberative conversation and converge over time towards unified conclusions or sentiments.

With respect to global conversational summaries, when the server detects convergence in conclusions or sentiments (using, for example, the LLM via an API), the server can send the dialogue blocks that are stored for each of the parallel rooms to the Large Language Model and, using API calls, ask the LLM for processing. The processing includes generating a conversational summary across sub-groups, including an indication of the central points made among sub-groups, especially points that have strong support across sub-groups and arguments raised. In some cases, the processing assesses the strength of the sentiments associated with the points made and arguments raised. The Global Conversational Summary is generated as a block of conversation expressed from the perspective of an observer who is watching each of the sub-groups. The global conversational summary can be expressed from the perspective of a global surrogate that expresses the summary inside each sub-group to inform the users of the outcome of the parallel conversations in other sub-groups, (i.e., the conclusions of the large population or a sub-population divided into sub-groups).

In some embodiments, the system provides a global summary to a human moderator that the moderator sees at any time during the process. Accordingly, the moderator is provided with an overall view of the discussions in the sub-groups during the process.

Figure 3:
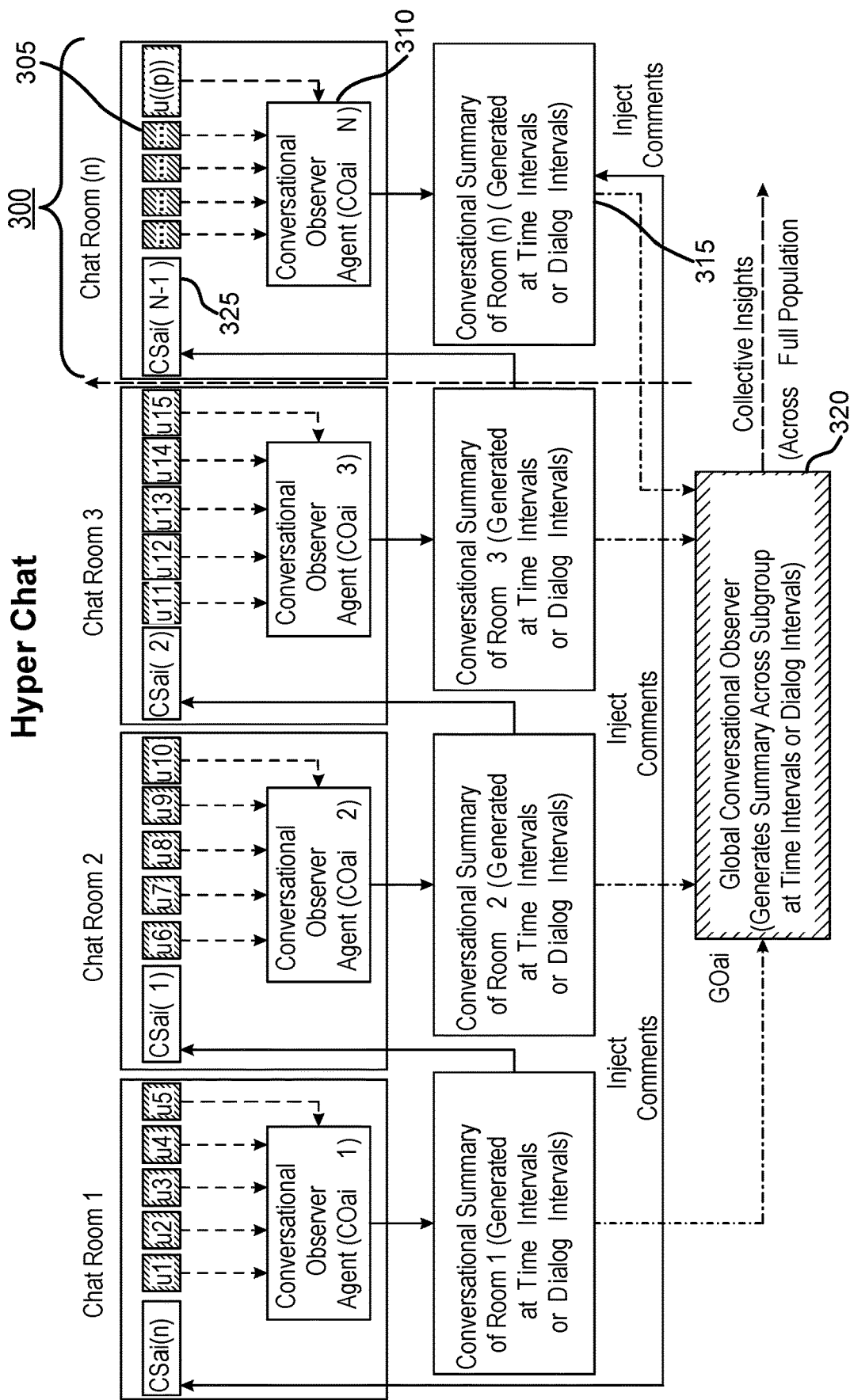
FIG. 3 shows an example of a hyperchat process according to aspects of the present disclosure.

FIG. 3 shows an example of a hyperchat process according to aspects of the present disclosure. The example shown includes chat room 300, conversational dialogue 315, and global conversation observer 320.

According to the exemplary hyperchat process shown in FIG. 3, a plurality of chat rooms 300 (n) include 5 users each. The number of users is used for instructional purposes. However, most implementations of HyperChat can employ different populations of users in each chat room. In preferred embodiments, the full population (p) is divided into a sufficient number of chat rooms (n) such that the number of users in each room is appropriately sized for coherent deliberative real-time conversations.

According to some experts, the ideal size for human groups to hold deliberative conversations ranges from 4 to 7 users, with significant degradation occurring in group sizes over 10 users. Thus, the collaboration server of the present embodiment can be configured in software to automatically divide a full population (p) of users into a sufficient number of sub-groups and associated chat rooms (n) so as to ensure the deliberating sup-groups fall within a target size range such as 4 to 7 users or to ensure the sub-group size does not go above a defined threshold size such as 10 users.

The users in the full population (p) are each using a computer (desktop, laptop, tablet, phone, etc. . . . ) running a HyperChat application to interact with the HyperChat server over a communication network in a client-server architecture. In case of HyperChat, the client application enables users to interact with other users through real-time dialog via text chat and/or voice chat and/or video chat and/or avatar-based VR chat.

As shown in FIG. 3, the HyperChat system divides the population of users into smaller subgroups referred to herein as chat room 300 which can be text-based, voice-based, video-based and/or avatar-based. The term "room" is a structural matter and does not imply the sub-groups need to be in an environment that looks, feels, or is called a room. In some cases, the rooms are defined by the fact that a member of a given room can communicate conversationally in real-time with other members of the room by exchanging real-time text and/or by exchanging real-time voice and/or by exchanging real-time video and/or by exchanging real-time information that represents avatars associated with the respective users. Chat room 300 is an example of, or includes aspects of, the corresponding element described with reference to FIGS. 4-6.

In one aspect, chat room 300 includes user 305, conversational observer agent 310, and conversational surrogate agent 325. As an example shown in FIG. 3, there are 'n' sub-groups labeled Chat Room 1, Chat Room 2, Chat Room 3, up to Chat Room (n) respectively. The (n) sub-groups or chat rooms each have five users assigned to them (for illustration purposes, as the number of users in each sub-group may vary). According to the example, Sub-Group 1 has users (u1) to (u5), Sub-Group 2 has users (u6) to (u10), Sub-Group 3 has users (u11) to (u15), which would continue in this pattern up to Sub-Group (n) which has users up to (u(p)). User 305 is an example of, or includes aspects of, the corresponding element described with reference to FIGS. 1, 2, and 4-6.

Additionally, each sub-group is assigned an AI Agent (i.e., conversational observer agent 310) that monitors that real-time dialog among the users of that subgroup. The real-time AI monitor can be implemented using an API to interface with a Foundational Model such as GPT-3 or ChatGPT from OpenAI or LaMDA from Google or from another provider of a Large Language Model system. Conversational observer agent 310 monitors the conversational interactions among the users of that sub-group and generates informational summaries 315 that assess, compress, and represent the informational content expressed by one or more users of the group (and optionally the conviction levels associated with different elements of informational content expressed by one or more users of the group). The informational summaries 315 are generated at various intervals, which can be based on elapsed time (for example every three minutes) or can be based on conversational interactions (for example, after a certain number of individuals speak via text or voice in that room).

In case of both, a time-based interval or a conversational-content-based interval, conversational observer agent 310 extracts a set of key points expressed by members of the group, summarizing the points in a compressed manner (using LLM), optionally assigning a conviction level to each of the points made based on the level of agreement (or disagreement) among participants and/or the level of conviction expressed in the language used by participants and/or the level of conviction inferred from facial expressions, vocal inflections, body posture and/or body gestures of participants (in embodiments that use microphones, cameras or other sensors to capture that information). The conversational observer agent 310 then transfers the summary to other modules in the system (e.g., global conversational observer 320 and conversational surrogate agent 325). Conversational observer agent 310 is an example of, or includes aspects of, the corresponding element described with reference to FIGS. 2, 4, and 10.

Each of the conversational surrogate agent 325 receives informational summaries 315 from one or more conversational observer agents 310 and expresses the informational summaries in conversational form to users 305 of each subgroup during real-time conversations. According to the example shown in FIG. 3, CSai(N-1) 325 is a conversational surrogate agent that receives informational summaries from Subgroup (n-1) (i.e., based on the real-time conversations among humans in Chat Room (n-1)) and expresses a representation of the informational summaries in natural language form (text and/or voice and/or expressive avatar) to users of another subgroup. For example, CSai(N-1) 325 is assigned to sub-group (n) (i.e., Chat room (n)) which indicates that it receives informational summary 315 from sub-group (n-1) and express a representation of the informational summary (in natural language) to the users of subgroup (n).

Similarly, FIG. 3 indicates that conversational surrogate agent (CSai-2) receives an informational summary from sub-group 2 and expresses a representation of the summary (as natural language) to the users of sub-group 3. Likewise, conversational surrogate agent CSai(1) receives informational summaries from sub-group 1 and expresses a representation of those summaries (as natural language) to the users of sub-group 2. In this way, every subgroup shown in FIG. 3 receives informational summaries from at least one other sub-group. This ensures informational propagation across the full population (p) of users and individual participants only communicate directly (i.e., hold direct conversations) with few (e.g., 4) other individuals.

Here, 'n' can be extended to any number of users, for example 1000 users could be broken into 200 subgroups, each with 5 users, enabling coherent and meaningful conversations within subgroups with a manageable number of participants while also enabling natural and efficient propagation of conversational information between subgroups, thereby providing for knowledge, wisdom, insights, and intuition to propagate from subgroup to subgroup and ultimately across the full population.

Accordingly, a large population (for example 1000 networked users) can engage in a single conversation such that each participant feels like they are communicating with a small subgroup of other users, and yet informational content is shared between subgroups.

The content that is shared between subgroups is injected by the conversational surrogate agent 325 as conversational content presented as text chat from a surrogate member of the group or voice chat from a surrogate member of the group or video chat from a simulated video of a human expressing verbal content or VR-based Avatar Chat from a 3D simulated avatar of a human expressing verbal content.

Conversational surrogate agent 325 can be identified as an AI agent that expresses a summary of the views, opinions, perspectives, and insights from another subgroup. For example, the CSai agent in a given room, can express verbally—"I am here to represent another group of participants. Over the last three minutes, they expressed the following points for consideration." In some cases, the CSai expresses the summarized points generated by conversational observer agent 310.

Additionally, conversational observer agent 310 may generate summarized points at regular time intervals or intervals related to dialog flow. For example, if a three-minute interval is used, the conversational observer agent generates a summary 315 of the key points expressed in a given room over the previous three minutes. It would then pass the summary 315 to a conversational surrogate agent 325 associated with a different subgroup. The surrogate agent may be designed to wait for a pause in the conversation in the subgroup (i.e., buffer the content for a short period of time) and then inject the informational summary 315. The summary, for example, can be textually or verbally conveyed as—"Over the last three minutes, the participants in Subgroup 22 expressed that Global Warming is likely to create generational resentment as younger generations blame older generations for not having taken action sooner. A counterpoint was raised that younger generations have not shown sufficient urgency themselves."

In a more natural implementation, the conversational surrogate agent may be designed to speak in the first person, representing the views of a subgroup the way an individual human might. In this case, the same informational summary quoted in the paragraph above could be verbalized by the conversational surrogate agent as follows—"Having listened to some other users, I would argue Global Warming is likely to create generational resentment as younger generations blame older generations for not acting sooner. On the other hand, we must also consider that younger generations have not shown sufficient urgency themselves."

In an even more natural implementation, the conversational surrogate agent might not identify that it is summarizing the views of another subgroup, but simply offer opinions as if it was a human member of the subgroup—"It's also important to consider that Global Warming is likely to create generational resentment as younger generations blame older generations for not acting sooner. On the other hand, we must also consider that younger generations have not shown sufficient urgency themselves."

In the three examples, a block of informational content is generated by one subgroup, summarized to extract the key points, and then expressed into another subgroup. This provides for information propagation such that the receiving subgroup can consider the points in an ongoing conversation. The points may be discounted, adopted, or modified by the receiving subgroup. Since such information transfer is happening in each subgroup parallelly, a substantial amount of information transfer occurs.

As shown in FIG. 3, the amplification of collective intelligence (across the full population) can be overseen by a third artificial agent, i.e., global conversational observer agent (GOai) 320. Global conversational observer 320 takes informational summaries as input from each of conversational observer agents 310 (which include an extraction of key points and optionally include confidence and conviction assessments associated with each of the key points) across a plurality of the subgroups and produces a global informational summary at various intervals, i.e., based on elapsed time (for example every five minutes) or can be based on conversational interactions (for example, after a certain amount of dialogue has been generated across groups).

In case of each, a time-based interval or a conversational content-based interval, global conversational observer 320 extracts a set of key points expressed across subgroups, summarizes the points in a compressed manner, optionally assigning a conviction level to each of the points made based on the conviction identified within particular subgroups and/or based on the level of agreement across subgroups. Global conversational observer 320 documents and stores informational summaries 315 at regular intervals, thereby documenting a record of the changing sentiments of the full population over time and is also designed to output a final summary at the end of the conversation based on some or all of the stored global records. In some embodiments, when generating an updated or a Final Conversation Summary, the global conversational observer 320 weights the informational summaries 315 generated towards the end of the conversation substantially higher than those generated at the beginning of the conversation, as is generally assumed each group (and the networked of groups) gradually converges on the collective insights over time. Global conversational observer 320 is an example of, or includes aspects of, the corresponding element described with reference to FIGS. 4 and 5.

According to an exemplary embodiment, the collaborative system may be implemented among 800 people ((p) =800) to forecast the team that will win the Super Bowl next week. The conversational prompt in the example can be as follows—"The Kansas City Chiefs are scheduled to play the Philadelphia Eagles in the Super Bowl this Sunday. Who is going to win the game and why? Please discuss."

The prompt is entered by a moderator and is distributed by the HyperChat server (e.g., collaboration server as described with reference to FIGS. 1-2) to each of the HyperChat clients over communication networks (e.g., 800 users on the networked computing device described in FIGS. 1-2). The local HyperChat client application (e.g., local chat application described in FIGS. 1-2) that is running on the computer associated with each user displays the conversational prompt to the user. Thus, the prompt is sent from the collaboration server to 800 computing devices (e.g., desktops, laptops, phones, tablets, or other suitable devices with processing, input, and display capabilities). The prompt is shown to 800 users by the computing device associated with each user. The prompt can be displayed as text or as verbal content using a simulated voice. In some cases, the prompt can be provided by a visual representation of a human moderator (i.e., either a simulated flat video image or a 3D avatar). Thus, the 800 users who participate in the collaborative discussion and forecasting effort each receive the prompt: "The Kansas City Chiefs are scheduled to play the Philadelphia Eagles in the Super Bowl this Sunday. Who is going to win the game and why? Please discuss." In preferred embodiments, this happens at substantially the same time coordinated by the server, thus ensuring that all participants (across the plurality of sub-groups) kick off the discussion together.

The HyperChat server (i.e., collaboration server) performs a computational task that divides the 800 users into 80 subgroups (i.e., n=80) of 10 users each. The 80 subgroups can be considered as "Chat Room 1", "Chat Room 2", to "Chat Room 80". Thus, each of the 800 users are uniquely assigned to one of the 80 chat rooms. In some cases, the chat rooms can appear to the user as traditional text chat rooms in which each user is represented by a unique user name in text with 10 such unique user names in each room. In some cases, the chat rooms can appear to the user as a video conference call (e.g., Zoom) in which each user is represented by a webcam video feed with 10 video feeds in each room. The chat rooms can appear to the user as a 3D virtual conference room (e.g., Horizon Workroom) in which each of the 10 users appear as 3D avatars sitting around a virtual conference table to hold a conversation.

Accordingly, the HyperChat server creates 80 unique conversational spaces and assigns 10 unique users to each of the spaces and enables the 10 users in each space to hold a real-time conversation with the other users in the space. Each of the users are aware that the topic to be discussed, as injected into the rooms by the HyperChat Server, is "The Kansas City Chiefs are scheduled to play the Philadelphia Eagles in the Super Bowl this Sunday. Who is going to win the game and why? Please discuss."

According to some embodiments, a timer appears in each room, giving each subgroup six minutes to discuss the issue, surfacing the perspectives and opinions of various members of each group. As the users engage in real-time dialog (by text, voice, video, and/or 3D avatar), the conversational observer agent associated with each room monitors the dialogue. At one-minute intervals during the six-minute discussion, the conversational observer agent associated with each room may be configured to automatically generate an informational summary for that room for that one-minute interval. In some embodiments, the informational summary can refer to storing the one-minute interval of dialogue (e.g., either captured as text directly or converted to text through known speech to text methods) and then sending the one minute of text to a foundational AI model (e.g., ChatGPT) via an API with a request that the Large Language Model summarize the one minute of text, extracting the most important points and ordering the points from most important to least important based on the conviction of the subgroup with regard to each point. Conviction may be assessed based on the strength of the sentiment assessing each point by individual members and/or based on the level of agreement among members on each point. A language model like GPT-3.5 can identify conviction in written content, for example, by analyzing language and vocabulary choice, sentence structure, emotional tone, consistency and repetition, rhetorical devices, and subject matter. However, limitations such as context, cultural differences, irony, sarcasm, and lack of emotional understanding can affect accuracy. The ChatGPT engine produces an informational summary for each conversational observer agent (i.e., an informational summary for each group. Note—in this example, this process of generating the conversational summary of the one-minute interval of conversation would happen multiples times during the full six-minute discussion.

Each time a conversational summary is generated for a sub-group by an observer agent, a representation of the informational content is then sent to a conversational surrogate agent in another room. As shown in FIG. 3, each room is associated with another room in a ring structure where the conversational observer agent of the last room in the list is associated with a conversational surrogate agent associated with the first room. While a ring structure is a viable way to have information propagate across all rooms, other network structures are possible for connecting conversational observer agent from one room to conversational surrogate agent in other rooms. In some examples, the network structures can include a ring structure with jumper cables across the ring to drive faster propagation of information. The network structure can also include randomized connections and/or small world connections.

Assuming the ring network structure shown in FIG. 3, at the end of each one-minute interval, an informational summary about the prior one minute of conversation held in Chat Room 1 will be injected into Chat Room 2 (via a conversational surrogate agent). At substantially the same time, an informational summary about the prior one-minute conversation held in Chat Room 2 will be injected into Chat Room 3 (via a conversational surrogate agent). The same thing happens between Chat Rooms 3 and 4, to the remaining pairs of rooms until an informational summary about the conversation held in Chat Room 80 will be injected into Chat Room 1 (via a conversational surrogate agent). Accordingly, each chat room is exposed to a conversational summary from another chat room. And this repeats over time, for multiple intervals, thereby enabling conversations in parallel chat rooms to remain independent but coordinated over time by the novel use of information propagation.

For example, a conversational surrogate agent in Chat Room 22 may express the informational summary received from Chat Room 21 as follows—"Having listened to another group of users, I would argue that the Kansas City Chiefs are more likely to win the Super Bowl because they have a more reliable quarterback, a superior defense, and have better special teams. On the other hand, recent injuries on the Chiefs could mean they don't play up to their full capacity while the Eagles are healthier all around. Still, considering all the issues the Chiefs are more likely to win."

The human participants in Chat Room 22 are thus exposed to the above information, either via text (in case of a text-based implementation) or by live voice (in case of a voice chat, video chat, or avatar-based implementation). A similar process is performed in each room, i.e., with different information summaries.

In parallel to each of the informational summaries being injected into an associated subgroups for consideration by the user of the subgroup, the informational summaries for the 80 subgroups are routed to the global conversational observer agent which summarizes the key points across the 80 subgroups and assesses conviction and/or confidence based on the level of agreement among subgroups. For example, if 65 of the 80 subgroups were leaning towards the Chiefs as the likely Super Bowl winner, a higher conviction score would be assigned to that sentiment as compared to a situation where only 45 of the 80 subgroups were leaning towards the Chiefs as the likely Superbowl Winner.

Additionally, when the users receive the informational summary from another room into their room, an optional updated prompt may be sent to each room and displayed, asking the members of each group to have an additional conversational period in light of the updated prompt, thus continuing the discussion in consideration of their prior discussion and the information received from another subgroup and the updated prompt. In this example, the second conversational period can be another six-minute period. However, in practice the system may be configured to provide a slightly shorter time period. For example, a four-minute timer is generated in each subgroup.

In some cases, the users engage in real-time dialogue (by text, voice, video, and/or 3D avatar) for the allocated time period (e.g., four minutes). At the end of four minutes, the conversational observer agent associated with each room is tasked with generating a new informational summary for the room for the prior four minutes using similar techniques. In some embodiments, the summary includes the prior six minute time period, but is weighted less in importance. In some cases, conviction may be assessed based on the strength of the sentiment assessing each point by individual members and/or based on the level of agreement among members on each point. Additionally, agreement of sentiments in the second time period with the first time period may also be used as an indication of higher conviction.

The informational summary from each conversational observer agent is then sent to a conversational surrogate agent in another room. Assuming the ring network structure shown in FIG. 3, an informational summary about the prior four minute conversation held in Chat Room 1 is injected into Chat Room 2 (via a conversational surrogate agent). At substantially the same time, an informational summary about the prior four minute conversation held in Chat Room 2 is injected into Chat Room 3 (via a conversational surrogate agent). The same process is performed between Chat Rooms 3 and 4, and so forth, through all of the 79 pairs of rooms, until an informational summary about the conversation held in Chat Room 80 is injected into Chat Room 1 (via a conversational surrogate agent). Accordingly, each chat room is exposed to a second conversational summary from another chat room.

Regardless of the specific time periods used as the interval for conversational summaries, each room is generally exposed to a multiple conversational summaries over the duration of a conversation. In the simplest case of a first time period and a second time period, it's important to clarify that in the second time period, each room is exposed to a second conversational summary from the second time period reflecting the sentiments of the same subgroup it received a summary from in the first time period. In other embodiments, the order of the ring structure can be randomized between time periods, such that in the second time period, each of the 80 different subgroups is associated with a different subgroup than it was associated with in the first time period. In some cases, such randomization increases the informational propagation across the population.

In case of a same network structure or an updated network structure used between time periods, the users consider the informational summary in the room and then continue the conversation about who will win the super bowl for the allocated four minute period. At the end of the four minute period, the process can repeat with another round (e.g., for another time period, for example of two minutes, with another optionally updated prompt). In some cases, the process can conclude if the group has sufficiently converged on a collective intelligence prediction, solution, or insight.

At the end of various conversational intervals (by elapsed time or by elapsed content), the Collaboration Server can be configured to optionally route the informational summaries for that interval to the global conversational observer agent which summarizes the key points across the (n) subgroups and assesses conviction and/or confidence based on the level of agreement among subgroups to assess if the group has sufficiently converged. For example, the Collaboration Server can be configured to assess if the level of agreement across subgroups is above a threshold metric. If so the process is considered to reach a conversational consensus. Conversely, if the level of agreement across subgroups has not reach a threshold metric, the process is deemed to require further deliberation. In this way, the Collaboration Server can intelligently guide the population to continue deliberation until a threshold level of agreement is reached, at which point the Collaboration Server ends the deliberation.

In case of further deliberation, an additional time period is automatically provided and the subgroups are tasked with considering the latest informational summary from another group along with their own conversations and discuss the issues further. In the case of the threshold being met, the Conversation Server can optionally send a Final Global Conversational Summary to all the sub-groups, informing all participants of the final consensus reached.

Figure 4:
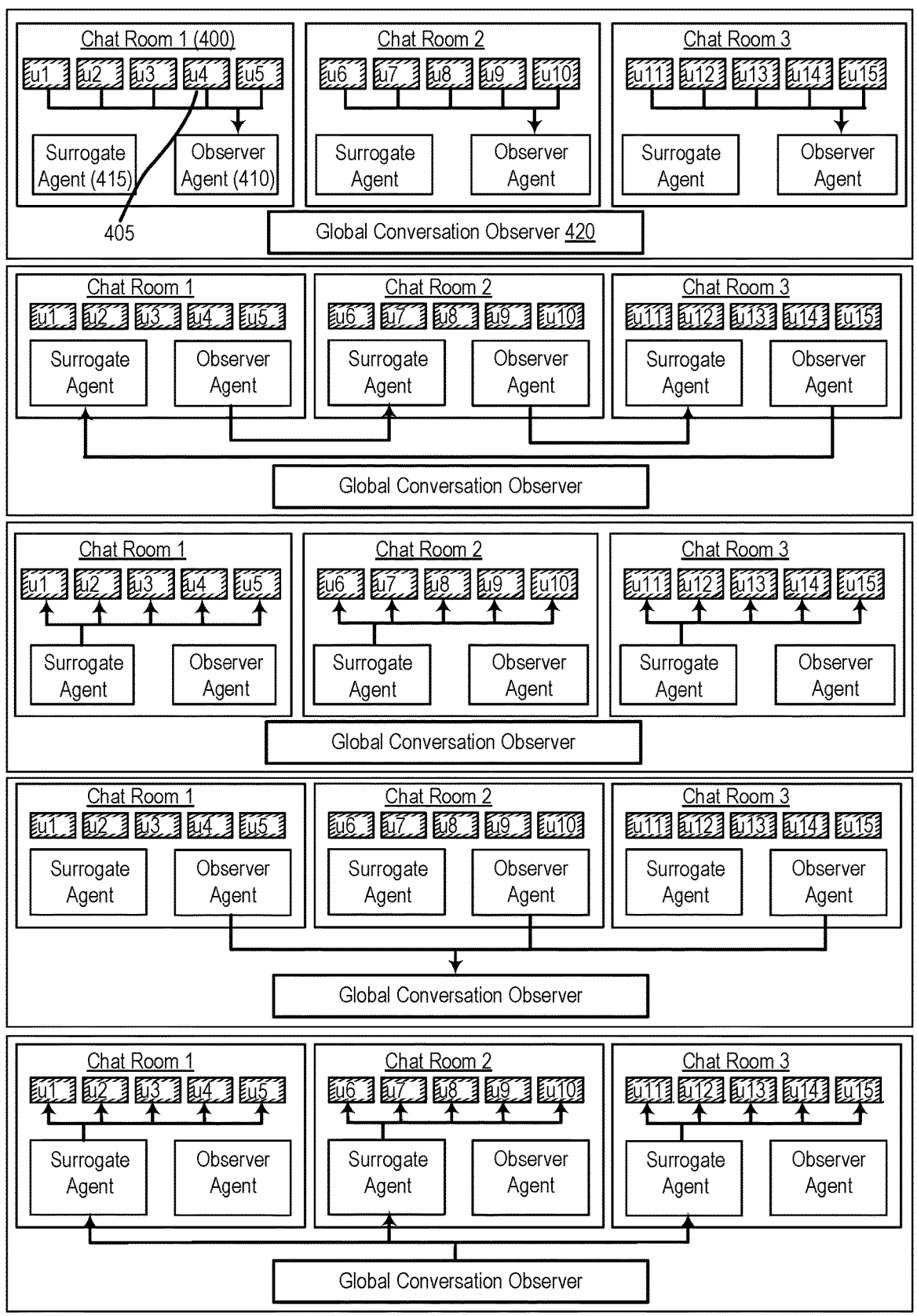
FIGS. 4 through 5 show examples of an interaction process according to aspects of the present disclosure.

FIG. 4 shows an example of an interaction process according to aspects of the present disclosure. The example shown includes chat room 400 and global conversation observer 420.

Chat room 400 is an example of, or includes aspects of, the corresponding element described with reference to FIGS. 3, 5, and 6. In one aspect, chat room 400 includes user 405, conversational observer agent 410, and conversational surrogate agent 415. User 405 is an example of, or includes aspects of, the corresponding element described with reference to FIGS. 1-3, 5, and 6.

Conversational observer agent 410 is an example of, or includes aspects of, the corresponding element described with reference to FIGS. 2, 3, and 10. Conversational surrogate agent 415 is an example of, or includes aspects of, the corresponding element described with reference to FIGS. 2 and 11. Global conversation observer 420 is an example of, or includes aspects of, the corresponding element described with reference to FIGS. 3 and 5.

FIG. 4 shows an interaction process for collaborative conversations as a 5-step process. In the first step, a large population engages in a single conversation such that each participant is associated with one of a plurality of small subgroups of users and is enabled to directly communicate with the other users in that unique subgroup of users. Conversational observer agent 410 (e.g., conversational observer agent as described with reference to FIGS. 1-3) keeps track of the conversation among each subgroup and generates summaries using the LLM (as described with reference to FIGS. 1-3).

In the second step, the collaboration server (described with reference to FIGS. 1-2) uses the conversational observer agent to coordinate information exchange between the separate chat rooms (i.e., between the separate conversations happening in parallel among separate subgroups). The information exchange is performed when the conversational observer agent generates a conversational representation of the summary (e.g., using LLM) for a given chat room of a given sub-group and sends the summary representation to conversational surrogate agent 415 of another chat room for another sub-group.

In some cases, conversational observer agent 410 may generate summarized points to be sent at regular time intervals or intervals related to dialogue flow. The content that is shared between subgroups is injected by the conversational surrogate agent 415 (in the third step) as conversational content and presented as text chat or voice chat or video chat from a simulated video to the users of the respective sub-group by a surrogate member (i.e., conversational surrogate agent 415) of the group. Accordingly, a block of informational content is generated by one subgroup, summarized to extract the key points, and then expressed into another subgroup.

In a third step, the plurality subgroups continue their parallel deliberative conversations, now with the benefits of the informational content received in the second step. In this way, the participants in each subgroup can consider, accept, reject, or otherwise discuss a ideas and information from another subgroup, thereby enabling conversational content to gradually propagate across the full population in a thoughtful and proactive manner.

In preferred embodiments, the second and third steps are repeated multiple times (at intervals) enabling information to continually propagate across subgroups during the real-time conversation. By enabling local real-time conversations in small deliberative subgroups, while simultaneously enabling real-time conversational content to propagate across subgroups, the collective intelligence is amplified as the full population is enabled to converges on unified solutions.

According to some embodiments, in a fourth step, a global conversation observer 420 takes as input, the informational summaries that were generated by each of conversational observer agents 410, and processes that information, which includes an extraction of key points across a plurality of the subgroups, and produces a global informational summary.

Global conversational observer 420 documents and stores informational summaries at regular intervals, thereby documenting a record of the changing sentiments of the full population and outputs a final summary at the end of the conversation based on the stored global records. Global conversational observer 420, in a fifth step, provides the final summary to each surrogate agent 415, which in turn provides the final summary to each user in the collaborative system. In this way, all participants are made aware of the solution or consensus reached across the full population of participants.

Figure 5:
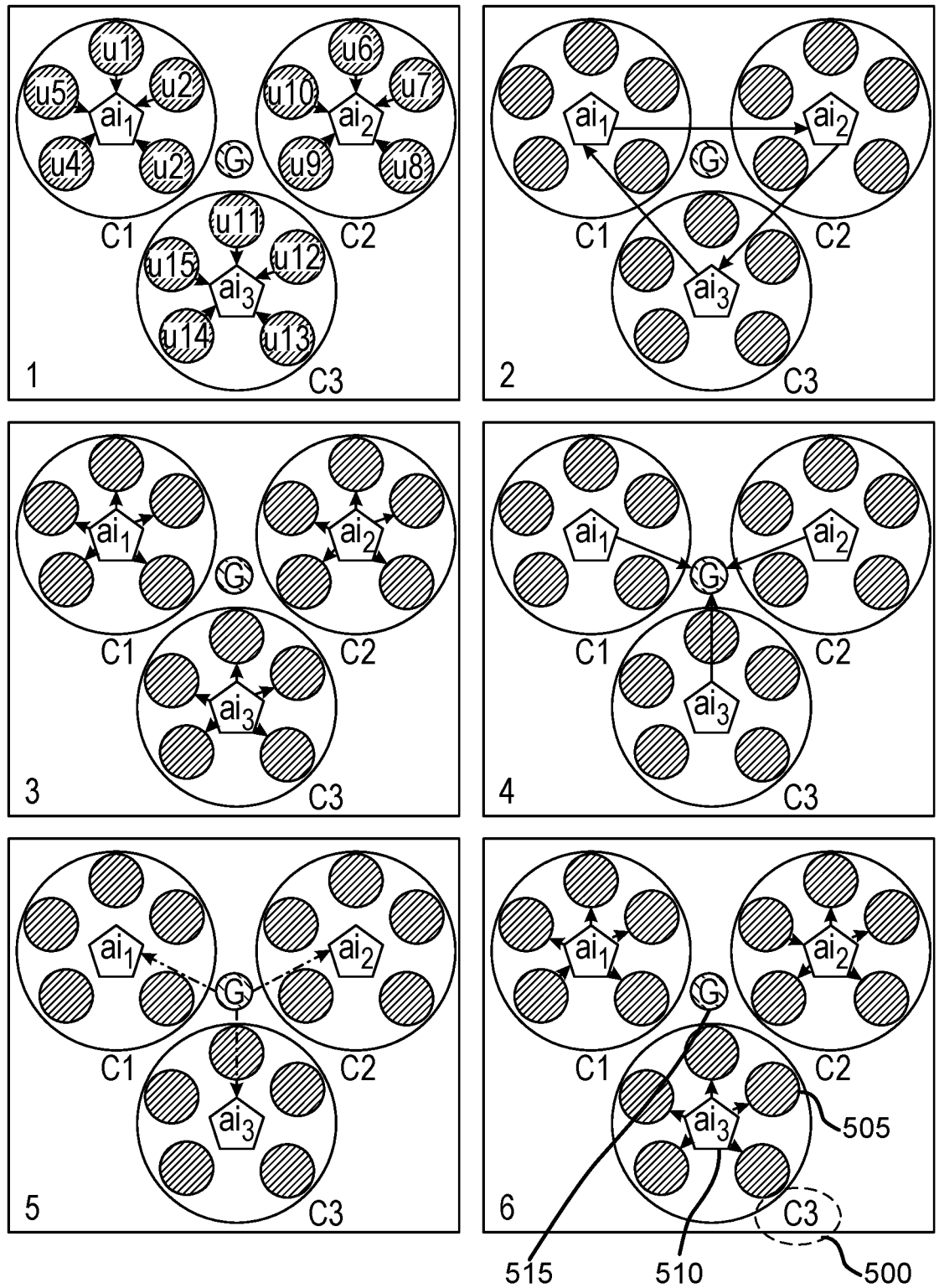

FIG. 5 shows an example of an interaction process according to aspects of the present disclosure. The example shown includes chat room 500 and global conversation observer 515.

Chat room 500 is an example of, or includes aspects of, the corresponding element described with reference to FIGS. 3, 4, and 6. In one aspect, chat room 500 includes user 505 and conversational agent 510. User 505 is an example of, or includes aspects of, the corresponding element described with reference to FIGS. 1-4, and 6.

In one aspect, conversational agent 510 may include a conversational observer agent and a conversational surrogate agent. Conversational observer agent and conversational surrogate agent are examples of, or include aspects of, the corresponding elements described with reference to FIGS. 1, 2, 3, 6, and 11. Global conversation observer 515 is an example of, or includes aspects of, the corresponding element described with reference to FIGS. 3 and 4.

As an example shown in FIG. 5, the interactive process for a collaboration system is shown as a 6 step process (indicated by numbers 1-6). For example, in a first step (indicated in 1), users u1 to u15 in chat rooms C1, C2, and C3 perform parallel chat conversations that are captured by AI-based conversational agents 510 represented as ai1, ai2, and ai3 in chat rooms C1, C2, and C3 respectively. Details regarding the functions of the conversational agent are provided in FIGS. 1-4.

Each conversational agent 510 uses a LLM to generate an informational summary of the conversation of the chat rooms C1, C2, and C3. A representation of the informational summary thus generated is sent to the conversational agent of the next chat room in a ring structure as the second step (indicated in 2). For example, the conversational agent $ai_1$ of chat room C1 sends the summary of chat room C1 to the conversational agent $ai_2$ of chat room C2. Similarly, the conversational agent $ai_2$ of chat room C2 sends the summary of chat room C2 to the conversational agent $ai_3$ of chat room C3 and the conversational agent $ai_3$ of chat room C3 sends the summary of chat room C3 to the conversational agent ai1 of chat room C1. Further details regarding transferring the summary to other chat rooms is provided with reference to FIG. 3.

Each conversational agent 510 of a chat room shares the informational summary received from the other chat room to the users of the respective chat room (as a third step indicated by 3). As an example shown in FIG. 5, the conversational agent ai1 of chat room C1 shares the summary of chat room C3 with the users of chat room C1. Similarly, the conversational agent $ai_2$ of chat room C2 shares the summary of chat room C1 with the users of chat room C2 and the conversational agent $ai_3$ of chat room C3 shares the summary of chat room C2 with the users of chat room C3. Further description regarding this step is provided with reference to FIG. 3.

Steps 1, 2, and 3 may optionally repeat a number of times, enabling users to hold deliberative conversations in the three parallel chat rooms for multiple intervals after which conversational information propagates across rooms as shown.

In step four, the conversational agents corresponding to each chat room send the informational summary to global conversation observer (G) 515 (fourth step indicated by 4). The global conversation observer 515 generates a global conversation summary after the each of the chat rooms hold parallel conversations for some time while incorporating content from the informational summaries passed between chat rooms. For example, the global conversation summary is generated based on the informational summaries from each chat room over one or more conversational intervals.

In the fifth and sixth steps (indicated in 5 and 6), the global conversation summary is provided to conversational agent 510 of each chat room C1, C2, and C3, which in turn share the global conversation summary with the users in the chat room. Details regarding this step are provided with reference to FIG. 3.

Figure 6:
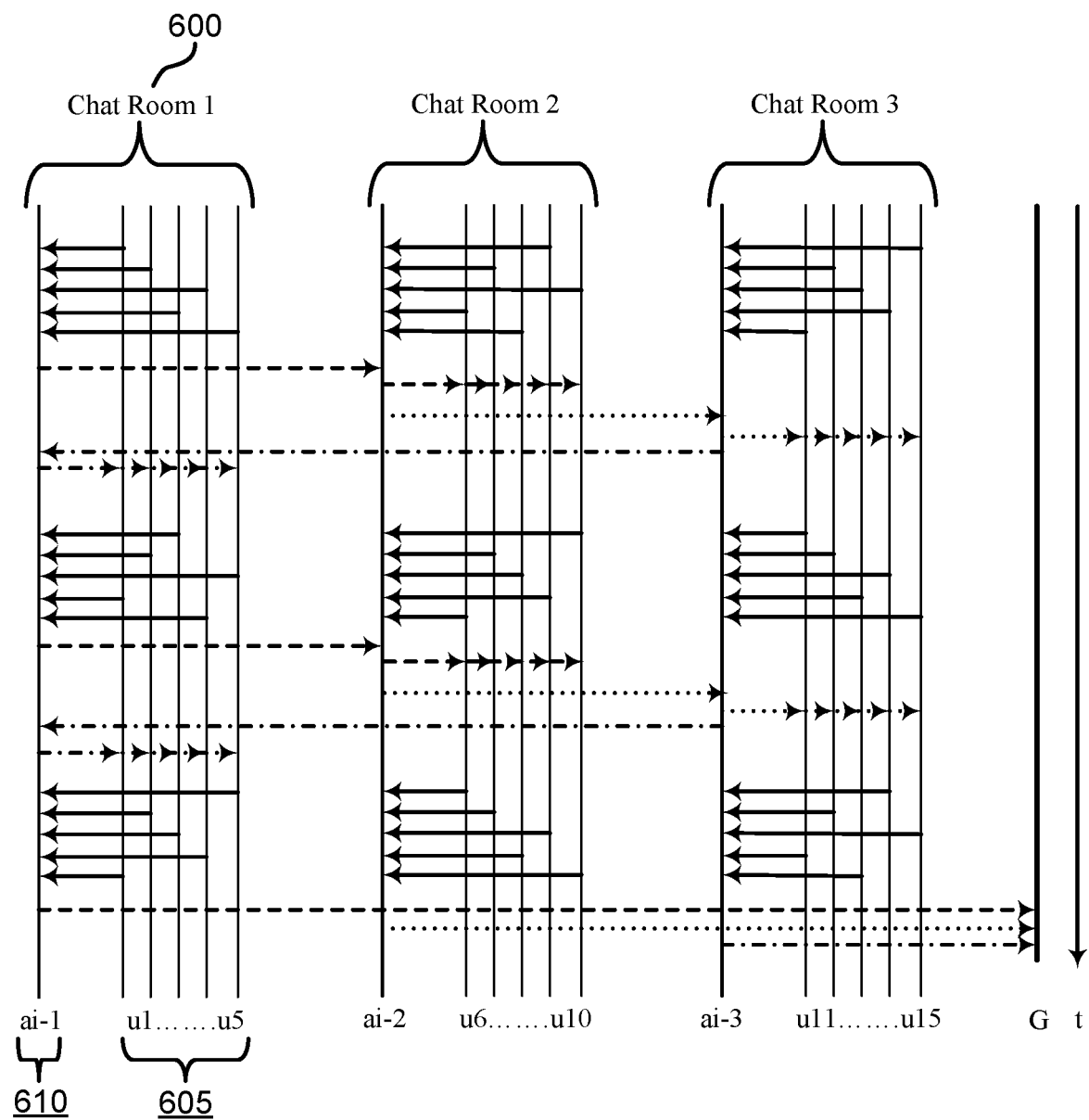
FIG. 6 shows an example of an interaction sequence between users and collaboration server according to aspects of the present disclosure.

FIG. 6 shows an example of an interaction sequence between users and collaboration server according to aspects of the present disclosure.

Chat room 600 is an example of, or includes aspects of, the corresponding element described with reference to FIGS. 3-5. In one aspect, chat room 600 includes user 605 and conversational agent 610. User 605 is an example of, or includes aspects of, the corresponding element described with reference to FIGS. 1-5. Conversational agent 610 is an example of, or includes aspects of, the corresponding element described with reference to FIGS. 1-5.

According to the embodiments, users 605 (u1-u5 in Chat Room 1, u6-u10 in Chat Room 2, and u11-u15 in Chat Room 3) participate in parallel chat conversations. Then, at various times, such as periodically at varying or fixed intervals (measured as elapsed time or as elapsed conversational flow), the server uses an AI-based conversational agent 610 to coordinate information exchange between the separate chat rooms (i.e., between the separate conversations happening in parallel). For example, the conversational agent corresponding to Chat Room 1 is ai-1, corresponding to Chat Room 2 is ai-2, and corresponding to Chat Room 3 is ai-3.

As an example shown in FIG. 6, the information exchange is performed by sending a conversational representation of the summary generated for a given chat room of a given sub-group (e.g., generated for a block of conversation from Chat Room 1) and sending the summary representation to another chat room for another sub-group (e.g., sending the summary representation to Chat Room 2) using conversational agent 610. For example, ai-1 sends the generated summary for Chat Room 1 to ai-2. Similarly, ai-2 sends the summary generated for Chat Room 2 to ai-3 and ai-3 sends the summary generated for Chat Room 3 to ai-1.

Additionally, as shown in FIG. 6, the conversational agent 610 of one sub-group shares the summary of another sub-group with the users of the one sub-group. For example, ai-1 receives a summary corresponding to Chat Room 3 from ai-3 and shares it with the users of Chat Room 1. Similarly, ai-2 receives a summary corresponding to Chat Room 1 from ai-1 and shares it with the users of Chat Room 2 and ai-3 receives a summary corresponding to Chat Room 2 from ai-2 and shares it with the users of Chat Room 3.

According to some embodiments, as shown in FIG. 6, each conversational agent 610 identifies the user who speaks (i.e., enters a chat message), when each chat message is entered, the content of each chat message, the user to whom each chat message responds, whether each chat message agrees or disagrees with the chat message to which it is responding, the strength of the agreement or disagreement, etc.

In some examples, a collaboration server (as described with reference to FIGS. 1-2) tracks the conversational dialogue, i.e., the flow of messaging over time (t) as transpired between the users in a sub-group and stores it in a separable memory for each of the different sub-groups.

According to embodiments of the present disclosure, the collaborative server coordinates the real-time chat among the users within each of the plurality of sub-groups, routing real-time chat messages to the correct sub-groups such that the members of each sub-group can hold a conversation among themselves, i.e., in parallel or at the same time (t) with other sub-groups having separate conversations among themselves (as shown in FIG. 6). The conversations in each of the sub-groups are on the same topic, coordinated by the at least one conversational prompt sent to the sub-group members.

Next, the collaborative server stores a record of the conversation in each sub-group in a memory associated with the sub-group. As is shown in FIG. 6, the server tracks the dialogue that transpires over time, including a record of the speaker, the time of speaking, the content, and concerning comments from the other users of the same sub-group. Accordingly, the server records a history of the chat dialogue as seen by the users in the respective sub-group.

Additionally, at a plurality of time intervals throughout the session, the server captures a recent block of dialogue from a given sub-group and sends the dialogue block to a Large Language Model (LLM) for processing. A summary generated by the LLM is a block of conversation expressed, e.g., from the first-person perspective of an observer in the sub-group.

Additionally, after the server generates a conversational summary for each sub-group, the conversational agent 610 sends the summary to a different sub-group such that the conversational summary is expressed as conversational dialogue within the conversation of the other sub-group. After the sub-groups hold parallel conversations for some time, the summaries passed between sub-groups are sent to the global conversational agent G that generates a global conversational summary. The global conversational summary expresses the summary inside each sub-group to inform the users of the outcome of the parallel conversations in other sub-groups, i.e., the conclusions of the larger population (or a sub-population divided into sub-groups).

The collaboration server can enable a global conversational agent G (e.g., an assigned human moderator) that can send global chat messages that are received by users in the sub-groups at substantially the same time. The global conversational agent G can give instructions or background information to the large group such that each user can see/read the instruction/background information. In some cases, when users of each sub-group chat, the users see the messages within their respective sub-group.

Collaboration Process

A method, apparatus, non-transitory computer readable medium, and system for computer mediated collaboration for distributed conversations is described. One or more aspects of the method, apparatus, non-transitory computer readable medium, and system include providing a collaboration server running a collaboration application, the collaboration server in communication with the plurality of the networked computing devices, each computing device associated with one member of the population of human participants, the collaboration server defining a plurality of sub-groups of the population of human participants, the collaboration server comprising: providing a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device other members of the assigned sub-group; and enabling through communication between the collaboration application running on the collaboration server and the local chat applications running on each of the plurality of networked computing devices.

In some cases, the enabling through communication comprises the following steps: at step (a), sending the conversational prompt to the plurality of networked computing devices, the conversational prompt comprising a question, issue, or topic to be collaboratively discussed by the population of human participants; at step (b), presenting, substantially simultaneously, a representation of the conversational prompt to each member of the population of human participants on a display of the computing device associated with that member; at step (c), dividing the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants; at step (d), collecting and storing a first conversational dialogue in a first memory portion at the collaboration server from members of the population of human participants in the first sub-group during an interval via a user interface on the computing device associated with each member of the population of human participants in the first sub-group; at step (e), collecting and storing a second conversational dialogue in a second memory portion at the collaboration server from members of the population of human participants in the second sub-group during the interval via a user interface on the computing device associated with each member of the population of human participants in the second sub-group; at step (f), collecting and storing a third conversational dialogue in a third memory portion at the collaboration server from members of the population of human participants in the third sub-group during the interval via a user interface on the computing device associated with each member of the population of human participants in the third sub-group; at step (g), processing the first conversational dialogue at the collaboration server using a large language model to express a first conversational summary in conversational form; at step (h), processing the second conversational dialogue at the collaboration server using the large language model to express a second conversational summary in conversational form; at step (i), processing the third conversational dialogue at the collaboration server using the large language model to express a third conversational summary in conversational form; at step (j), sending the first conversational summary expressed in conversational form to each of the members of a first different sub-group, wherein the first different sub-group is not the first sub-group; at step (k), sending the second conversational summary expressed in conversational form to each of the members of a second different sub-group, wherein the second different sub-group is not the second sub-group; at step (l), sending the third conversational summary expressed in conversational form to each of the members of a third different sub-group, wherein the third different sub-group is not the third sub-group; and, at step (m), repeating steps (d) through (l) at least one time. Note—in many preferred embodiments, step (c), which involves dividing the population into a plurality of subgroups can be performed before steps (a) and (b).

Some examples of the method, apparatus, non-transitory computer readable medium, and system further include sending the first conversational summary expressed in conversational form to each of the members of a first different sub-group expressed in first person as if the first conversational summary were coming from a member of the first different sub-group of the population of human participants. Some examples further include sending the second conversational summary expressed in conversational form to each of the members of a second different sub-group expressed in first person as if the second conversational summary were coming from a member of the second different sub-group of the population of human participants. Some examples further include sending the third conversational summary expressed in conversational form to each of the members of a third different sub-group expressed in first person as if the third conversational summary were coming from a member of the third different sub-group of the population of human participants.

Some examples of the method, apparatus, non-transitory computer readable medium, and system further include processing, at step (n), the first conversational summary, the second conversational summary, and the third conversational summary using the large language model to generate a global conversational summary expressed in conversational form.

Some examples of the method, apparatus, non-transitory computer readable medium, and system further include sending the global conversational summary expressed in conversational form to each of the members of the first sub-group, the second sub-group, and the third sub-group.

In some aspects, the final global conversational summary is generated by weighting more recent ones of the global conversational summaries more heavily than less recent ones of the global conversational summaries.

In some aspects, the first conversational dialogue, the second conversational dialogue and the third conversational dialogue each comprise a set of ordered chat messages comprising text. In some aspects, the first conversational dialogue, the second conversational dialogue, and the third conversational dialogue each further comprise a respective member identifier for the member of the population of human participants who entered each chat message. In some aspects, the first conversational dialogue, the second conversational dialogue and the third conversational dialogue each further comprises a respective timestamp identifier for a time of day when each chat message is entered.

In some aspects, the processing the first conversational dialogue in step (g) further comprises determining a respective response target indicator for each chat message entered by the first sub-group, wherein the respective response target indicator provides an indication of a prior chat message to which each chat message is responding. In some aspects, the processing the second conversational dialogue in step (h) further comprises determining a respective response target indicator for each chat message entered by the second sub-group, wherein the respective response target indicator provides an indication of a prior chat message to which each chat message is responding. In some aspects, the processing the third conversational dialogue in step (i) further comprises determining a respective response target indicator for each chat message entered by the third sub-group, wherein the respective response target indicator provides an indication of a prior chat message to which each chat message is responding.

In some aspects, the processing the first conversational dialogue in step (g) further comprises determining a respective sentiment indicator for each chat message entered by the first sub-group, wherein the respective sentiment indicator provides an indication of whether each chat message is in agreement or disagreement with prior chat messages. In some aspects, the processing the second conversational dialogue in step (h) further comprises determining a respective sentiment indicator for each chat message entered by the second sub-group, wherein the respective sentiment indica- tor provides an indication of whether each chat message is in agreement or disagreement with prior chat messages. In some aspects, the processing the third conversational dialogue in step (i) further comprises determining a respective sentiment indicator for each chat message entered by the third sub-group, wherein the respective sentiment indicator provides an indication of whether each chat message is in agreement or disagreement with prior chat messages.

In some aspects, the processing the first conversational dialogue in step (g) further comprises determining a respective conviction indicator for each chat message entered by the first sub-group, wherein the respective conviction indicator provides an indication of conviction for each chat message. In some aspects, the processing the second conversational dialogue in step (h) further comprises determining a respective conviction indicator for each chat message entered by the second sub-group, wherein the respective conviction indicator provides an indication of conviction for each chat message. In some aspects, the processing the third conversational dialogue in step (i) further comprises determining a respective conviction indicator for each chat message entered by the third sub-group, wherein the respective conviction indicator provides an indication of conviction each chat message is in the expressions of the chat message.

In some aspects, the first unique portion consists of no more than ten members of the population of human participants, the second unique portion consists of no more than ten members of the population of human participants, and the third unique portion consists of no more than ten members of the population of human participants.

In some aspects, the first conversational dialogue comprises chat messages comprising voice. In some aspects, the voice includes words spoken, and at least one spoken language component selected from the group of spoken language components consisting of tone, pitch, rhythm, volume and pauses.

In some aspects, the first conversational dialogue comprises chat messages comprising video. In some aspects, the video includes words spoken, and at least one language component selected from the group of language components consisting of tone, pitch, rhythm, volume, pauses, facial expressions, gestures, and body language.

In some aspects, each of the repeating steps occurs after expiration of an interval. In some aspects, the interval is a time interval. In some aspects, the intervals are a number of conversational interactions.

In some aspects, the first different sub-group is the second sub-group, and the second different sub-group is the third sub-group. In some aspects, the first different sub-group is a first randomly selected sub-group, the second different sub-group is a second randomly selected sub-group, and the third different sub-group is a third randomly selected sub-group, wherein the first randomly selected sub-group, the second randomly selected sub-group and the third randomly selected sub-group are not the same sub-group.

Figure 7:
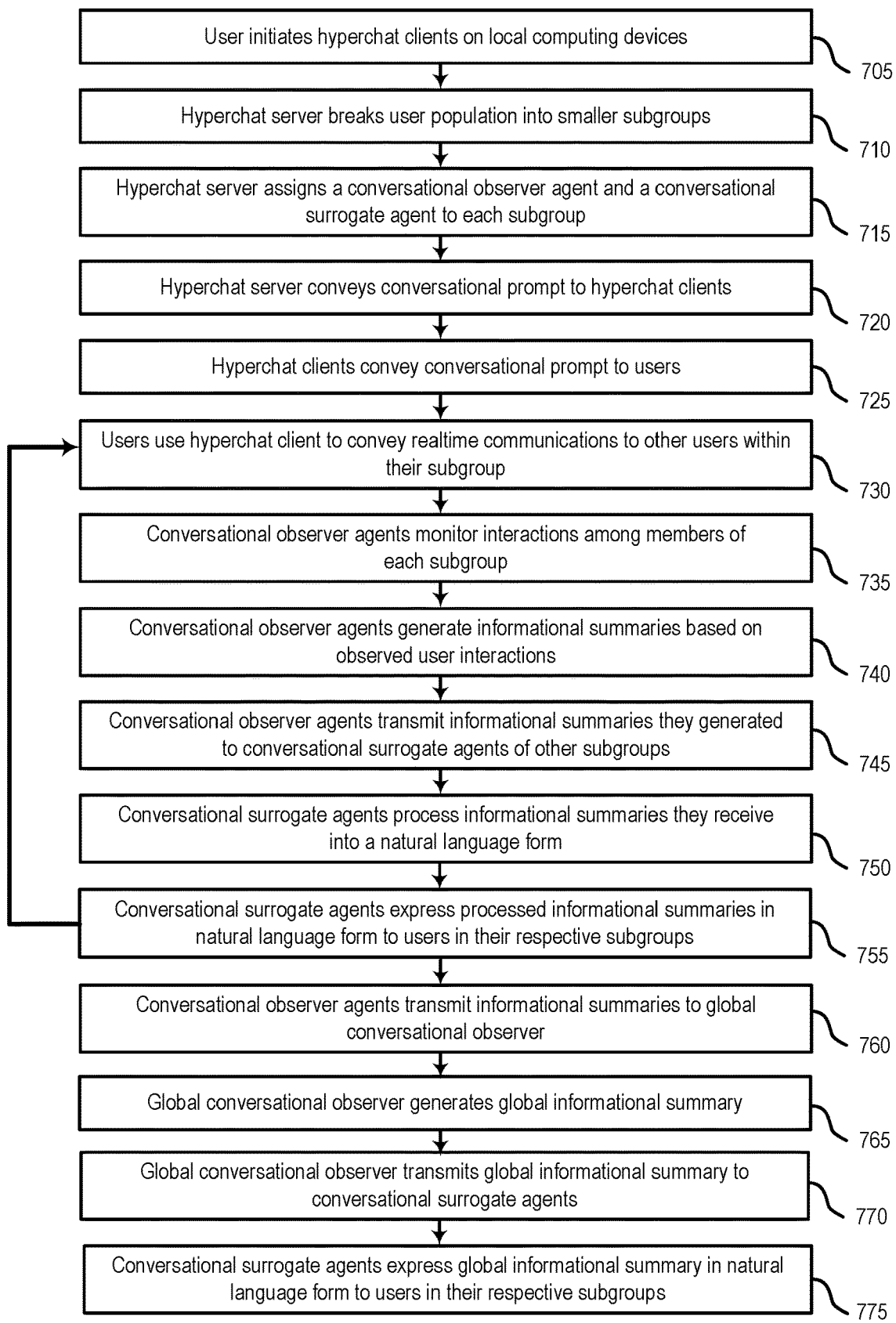
FIG. 7 shows an example of a flowchart for computer mediated collaboration according to aspects of the present disclosure.

FIG. 7 shows an example of a flowchart for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system initiates hyperchat clients (i.e., local chat application) on local computing devices. In some cases, the operations of this step refer to, or may be performed by, the user as described with reference to FIGS. 1-5.

At operation 710, the system breaks user population into smaller subgroups. In some cases, the operations of this step refer to, or may be performed by, the hyperchat server. According to some embodiments, the hyperchat server may be a collaboration server (described with reference to FIGS. 1-3).

At operation 715, the system assigns a conversational observer agent and a conversational surrogate agent to each subgroup. In some cases, the operations of this step refer to, or may be performed by, the hyperchat server or collaboration server as described with reference to FIGS. 1-3. In some cases, the observer agent and the surrogate agent are performed by the same software process and may be considered a single dual-purpose AI agent.

At operation 720, the system conveys conversational prompt to hyperchat clients. In some cases, the operations of this step refer to, or may be performed by, the hyperchat server or collaboration server as described with reference to FIGS. 1-3.

At operation 725, the system conveys conversational prompt to users within each subgroup. In some cases, the operations of this step refer to, or may be performed by, the hyperchat server or collaboration server as described with reference to FIGS. 1-3. In some embodiments the system expresses the prompt using different wording or style in different subgroups depending on the configuration of the surrogate agent with respect to that subgroup.

At operation 730, the system uses hyperchat client to convey real time communications to and from other users within their subgroup. In many preferred embodiments, this real-time communication is routed through the collaboration server, which mediates message passing among members of each subgroup via the hyperchat client. In some cases, the operations of this step refer to, or may be performed by, the user as described with reference to FIGS. 1-5.

At operation 735, the system monitors interactions among members of each subgroup. In some cases, the operations of this step refer to, or may be performed by, the conversational observer agent as described with reference to FIGS. 1-5.

At operation 740, the system generates informational summaries based on observed user interactions. In some cases, the operations of this step refer to, or may be performed by, the conversational observer agent as described with reference to FIGS. 1-5.

At operation 745, the system transmits informational summaries they generated to conversational surrogate agents of other subgroups. In some cases, the operations of this step refer to, or may be performed by, the conversational observer agent as described with reference to FIGS. 1-5.

At operation 750, the system processes informational summaries they receive into a natural language form. In some cases, the operations of this step refer to, or may be performed by, the conversational surrogate agent as described with reference to FIGS. 1-5.

At operation 755, the system expresses processed informational summaries in natural language form to users in their respective subgroups. In some cases, the operations of this step refer to, or may be performed by, the conversational surrogate agent as described with reference to FIGS. 1-5.

At operation 755, the process optionally repeats by jumping back to operation 730, thus enabling the members within each subgroup to continue their real-time dialog, their deliberations now influenced by the conversational content that was injected into their room. In this way, steps 730 to 755 can be performed at repeated intervals during which sub-groups deliberate, their conversations are observed, processed, and summarized, and a representation of the summary is passed into other groups. The number of iterations can be pre-planned in software, or can be based on pre-defined time limits, or can be dependent on the level of conversational agreement within or across subgroups. In all cases, the system will eventually cease repeating steps 730 to 755.

At operation 760, the system transmits informational summaries to global conversational observer. In some cases, the operations of this step refer to, or may be performed by, the conversational observer agent as described with reference to FIGS. 1-5. According to some embodiments, operation 760 is performed after operations 730 to 755 are performed parallelly for a certain time.

At operation 765, the system generates global informational summary. In some cases, the operations of this step refer to, or may be performed by, the global conversational observer as described with reference to FIGS. 1-5.

At operation 770, the system transmits global informational summary to conversational surrogate agents. In some cases, the operations of this step refer to, or may be performed by, the global conversational observer as described with reference to FIGS. 1-5.

At operation 775, the system expresses global informational summary in natural language form to users in their respective subgroups. In some cases, the operations of this step refer to, or may be performed by, the conversational surrogate agent as described with reference to FIGS. 1-5.

In some embodiments, the process at 775 optionally jumps back to operation 730, thus enabling the members within each subgroup to continue their real-time dialog, their deliberations now influenced by the global information summary that was injected into their room. The number of iterations (jumping back to 730) can be pre-planned in software, or can be based on pre-defined time limits, or can be dependent on the level of conversational agreement within or across subgroups.

In all examples, the system will eventually cease jumping back to operation 730. At that point, the system expresses a final global informational summary in natural language form to the users in their respective subgroups.

Figure 8:
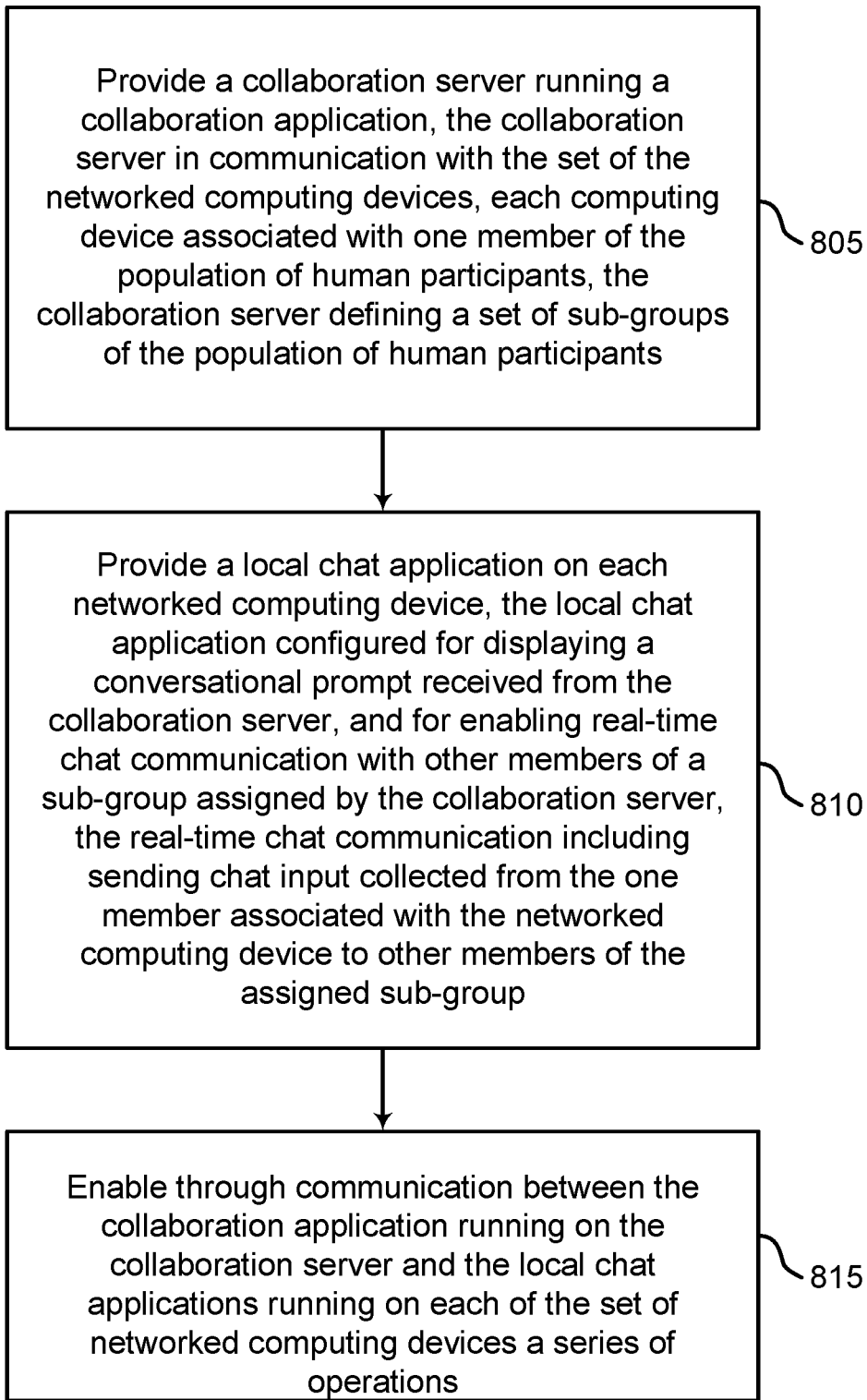
FIG. 8 shows an example of a method for computer mediated collaboration according to aspects of the present disclosure.

FIG. 8 shows an example of a method for computer mediated collaboration according to aspects of the present disclosure. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Embodiments of the present disclosure include a local chat application that provides for a real-time conversation between the one user of a sub-group using the local chat application and the plurality of other users assigned to the same sub-group.

In some cases, the local chat application is networked with a collaboration server that routes real-time chat messages to appropriate sub-groups such that the users of each sub-group can hold a conversation among themselves. Additionally, at a plurality of time intervals throughout the session, the collaboration server captures a recent block of dialogue from a given sub-group and sends the dialogue block to a LLM for processing to generate an informational summary for each sub-group. The informational summary of a sub-group is shared with the users of different sub-groups.

After the sub-groups hold parallel conversations for some time, the central/collaboration server can enable a global conversational observer that can send global chat messages received by users in the sub-groups at substantially the same time. The global conversational observer can give instructions or background information to the large group such that each user can see/read the instruction/background information.

At operation 805, the system provides a collaboration server running a collaboration application, the collaboration server in communication with the set of the networked computing devices, each computing device associated with one member of the population of human participants, the collaboration server defining a set of sub-groups of the population of human participants. In some cases, the operations of this step refer to, or may be performed by, a collaboration server as described with reference to FIGS. 1, 2, and 10.

At operation 810, the system provides a local chat application on each networked computing device, the local chat application configured for displaying a conversational prompt received from the collaboration server, and for enabling real-time chat communication with other members of a sub-group assigned by the collaboration server, the real-time chat communication including sending chat input collected from the one member associated with the networked computing device to other members of the assigned sub-group. In some cases, the operations of this step refer to, or may be performed by, a local chat application as described with reference to FIGS. 1, 2, and 11.

At operation 815, the system enables through communication between the collaboration application running on the collaboration server and the local chat applications running on each of the set of networked computing devices a series of operations. In some cases, the operations of this step refer to, or may be performed by, software components. In some cases, the software components may be included in the computing device and the collaboration server (as described with reference to FIGS. 1-2). In some cases, operation 815 includes the method 900 as described with reference to FIG. 9.

Figure 9:
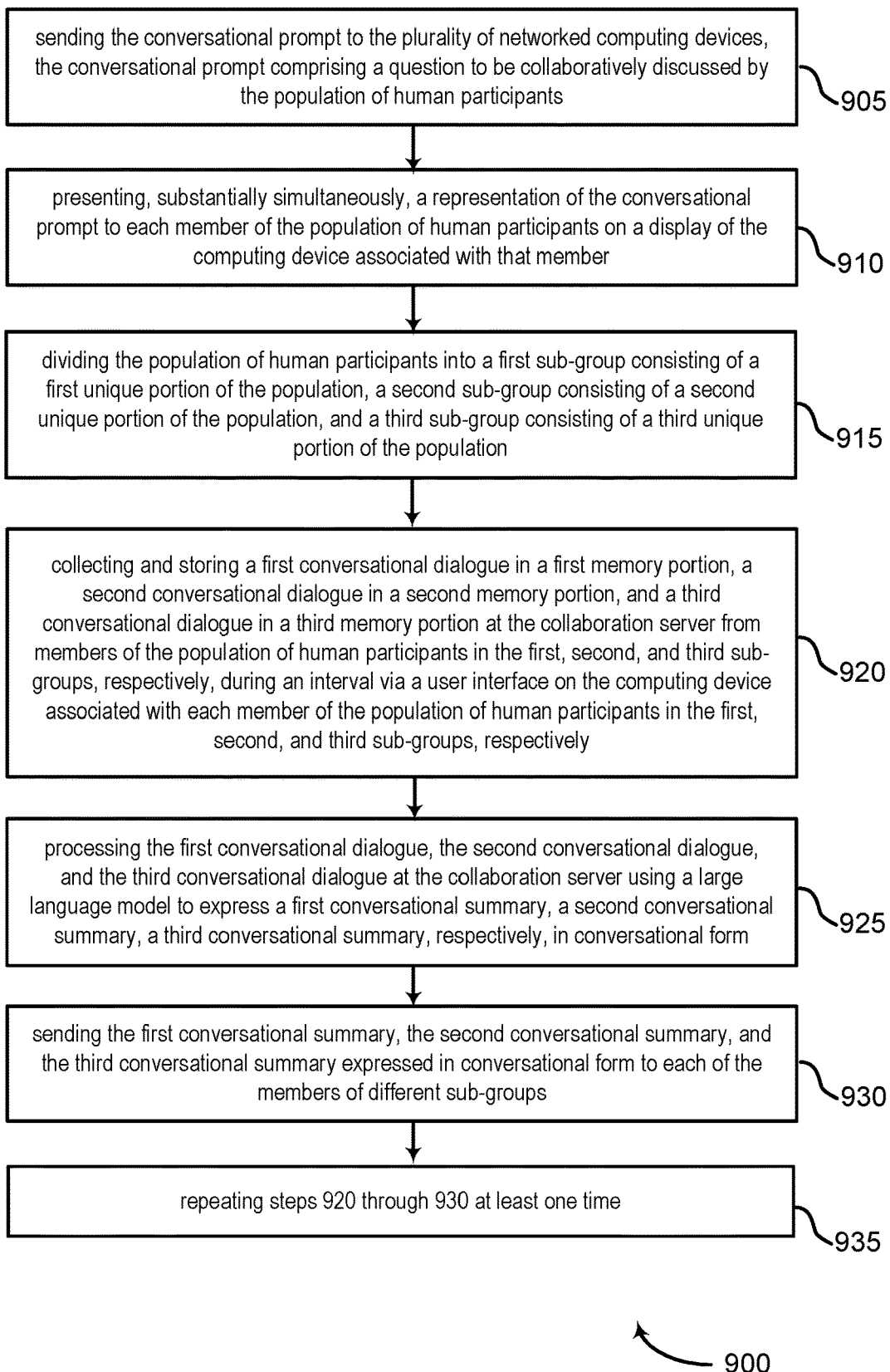
FIG. 9 shows an example of a method for enabling through communication according to aspects of the present disclosure.

FIG. 9 shows an example of a series of operations for a method 900 for enabling real-time deliberative conversations among large networked human groups according to aspects of the present disclosure. Variations of the present example may include performing the series of operations in a different order than the order in which the series of operations is presented here. In some examples, these operations are performed by a system including a processor executing a set of codes to control functional elements of an apparatus. Additionally, or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system sends the conversational prompt to the set of networked computing devices, the conversational prompt including a question, issue, or topic to be collaboratively discussed by the population of human participants. In some cases, the operations of each step refer to, or may be performed by, the collaboration server as described with reference to FIGS. 1-3.

At operation 910, the system presents substantially simultaneously, a representation of the conversational prompt to each member of the population of human participants on a display of the computing device associated with that member. In some cases, the operations of each step refer to, or may be performed by, the local chat application as described with reference to FIGS. 1-3.

At operation 915, the system divides the population of human participants into a first sub-group consisting of a first unique portion of the population, a second sub-group consisting of a second unique portion of the population, and a third sub-group consisting of a third unique portion of the population, where the first unique portion consists of a first set of users of the population of human participants, the second unique portion consists of a second set of users of the population of human participants and the third unique portion consists of a third set of users of the population of human participants. In some cases, the operations of each step refer to, or may be performed by, the collaboration server as described with reference to FIGS. 1-3. Note—operation 915 can be performed before operations 905 and 910.

At operation 920, the system collects and stores a first conversational dialogue in a first memory portion at the collaboration server from members of the population of human participants in the first sub-group during an interval via a user interface on the computing device associated with each member of the population of human participants in the first sub-group. Similarly, the system collects and stores a second conversational dialogue in a second memory portion at the collaboration server from members of the population of human participants in the second sub-group during the interval via a user interface on the computing device associated with each member of the population of human participants in the second sub-group. Additionally, the system collects and stores a third conversational dialogue in a third memory portion at the collaboration server from members of the population of human participants in the third sub-group during the interval via a user interface on the computing device associated with each member of the population of human participants in the third sub-group. In some cases, the operations of each step refer to, or may be performed by, the collaboration server as described with reference to FIGS. 1-3.

At operation 925, the system processes the first conversational dialogue at the collaboration server using a large language model to express a first conversational summary in conversational form. Similarly, the system processes the second conversational dialogue at the collaboration server using the large language model to express a second conversational summary in conversational form. Additionally, the system processes the third conversational dialogue at the collaboration server using the large language model to express a third conversational summary in conversational form. In some cases, the operations of each step refer to, or may be performed by, the large language model as described with reference to FIGS. 1-3.

At operation 930, the system sends the first conversational summary, the second conversational summary, and the third conversational summary expressed in conversational form (via text or voice) to each of the members of the different sub-groups. In some cases, the operations of each step refer to, or may be performed by, the conversational surrogate agent as described with reference to FIGS. 1-3.

At operation 935, the system repeats operations 920 through 930 at least one time.

Figure 10:
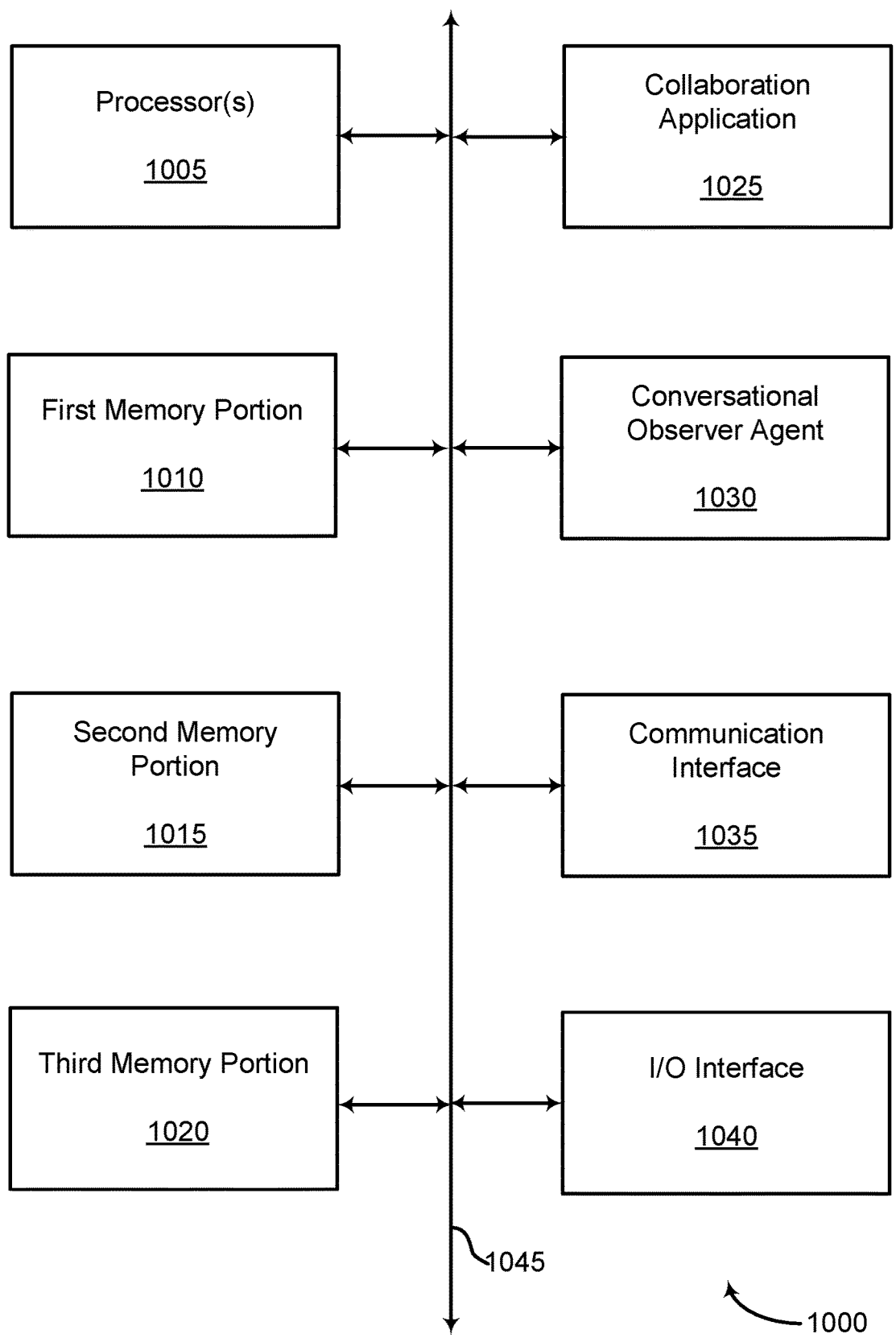
FIG. 10 shows an example of a collaboration server according to aspects of the present disclosure.

FIG. 10 shows an example of a collaboration server 1000 according to aspects of the present disclosure. In one aspect, collaboration server 1000 includes processor(s) 1005, first memory portion 1010, second memory portion 1015, third memory portion 1020, collaboration application 1025, conversational observer agent 1030, communication interface 1035, I/O interface 1040, and channel 1045.

Collaboration server 1000 is an example of, or includes aspects of, the corresponding element described with reference to FIGS. 1-3. In some embodiments, collaboration server 1000 includes one or more processors 1005 that can execute instructions stored in first memory portion 1010, second memory portion 1015, and third memory portion 1020 to provide a collaboration server running a collaboration application, the collaboration server in communication with the plurality of the networked computing devices, each computing device associated with one member of the population of human participants, the collaboration server defining a plurality of sub-groups of the population of human participants; provide a local chat application on each networked computing device, the local chat application configured for displaying a conversational prompt received from the collaboration server, and for enabling real-time chat communication with other members of a sub-group assigned by the collaboration server, said real-time chat communication including sending chat input collected from the one member associated with the networked computing device to other members of the assigned sub-group; and enable through communication between the collaboration application running on the collaboration server and the local chat applications running on each of the plurality of networked computing devices.

According to some aspects, collaboration server 1000 includes one or more processors 1005. In some cases, a processor is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or a combination thereof). In some cases, a processor is configured to operate a memory array using a memory controller. In other cases, a memory controller is integrated into a processor. In some cases, a processor is configured to execute computer-readable instructions stored in a memory to perform various functions. In some embodiments, a processor includes special purpose components for modem processing, baseband processing, digital signal processing, or transmission processing.

According to some aspects, each of first memory portion 1010, second memory portion 1015, and third memory portion 1020 include one or more memory devices. Examples of a memory device include random access memory (RAM), read-only memory (ROM), or a hard disk. Examples of memory devices include solid state memory and a hard disk drive. In some examples, memory is used to store computer-readable, computer-executable software including instructions that, when executed, cause a processor to perform various functions described herein. In some cases, the memory contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

According to some aspects, collaboration application 1025 enables users to interact with other users through real-time dialog via text chat and/or voice chat and/or video chat and/or avatar-based VR chat. In some cases, collaboration application 1025 running on the device associated with each user displays the conversational prompt to the user. In some cases, collaboration application 1025 is stored in the memory (e.g., one of first memory portion 1010, second memory portion 1015, or third memory portion 1020) and is executed by one or more processors 1005.

According to some aspects, conversational observer agent 1030 is an AI-based agent that extracts conversational content from a sub-group, sends the content to a LLM to generate a summary, and shares the generated summary with each user on the collaboration server 1000. In some cases, conversational observer agent 1030 is stored in the memory (e.g., one of first memory portion 1010, second memory portion 1015, or third memory portion 1020) and is executed by one or more processors 1005.

According to some aspects, communication interface 1035 operates at a boundary between communicating entities (such as collaboration server 1000, one or more user devices, a cloud, and one or more databases) and channel 1045 and can record and process communications. In some cases, communication interface 1035 is provided to enable a processing system coupled to a transceiver (e.g., a transmitter and/or a receiver). In some examples, the transceiver is configured to transmit (or send) and receive signals for a communications device via an antenna.

According to some aspects, I/O interface 1040 is controlled by an I/O controller to manage input and output signals for collaboration server 1000. In some cases, I/O interface 1040 manages peripherals not integrated into collaboration server 1000. In some cases, I/O interface 1040 represents a physical connection or port to an external peripheral. In some cases, the I/O controller uses an operating system such as iOS®, ANDROID®, MS-DOS®, MS-WINDOWS®, OS/2®, UNIX®, LINUX®, or other known operating system. In some cases, the I/O controller represents or interacts with a modem, a keyboard, a mouse, a touchscreen, or a similar device. In some cases, the I/O controller is implemented as a component of a processor. In some cases, a user interacts with a device via I/O interface 1040 or via hardware components controlled by the I/O controller.

Figure 11:
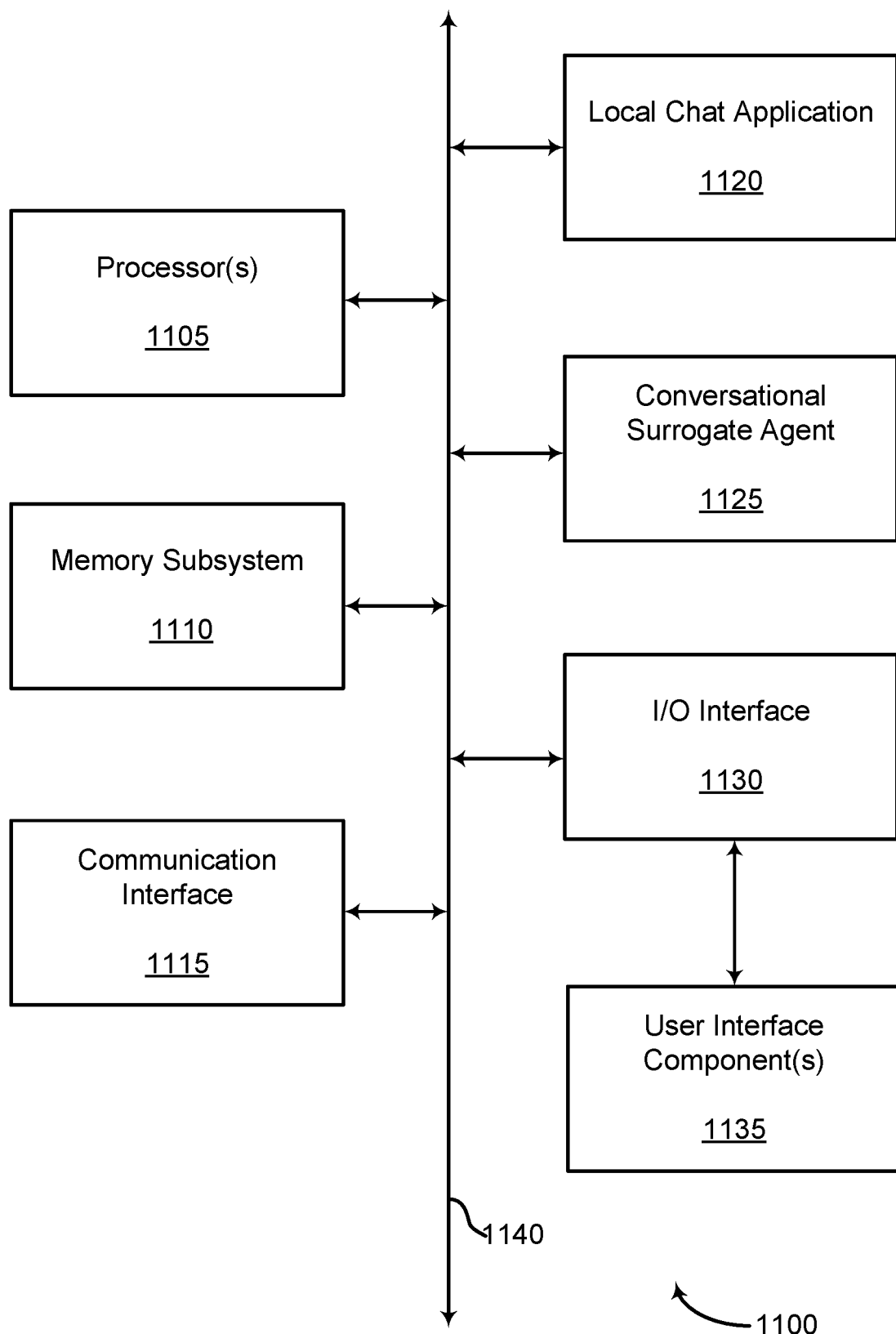
FIG. 11 shows an example of a computing device according to aspects of the present disclosure.

FIG. 11 shows an example of a computing device 1100 according to aspects of the present disclosure. In one aspect, computing device 1100 includes processor(s) 1105, memory subsystem 1110, communication interface 1115, local chat application 1120, conversational surrogate agent 1125, I/O interface 1130, user interface component 1135, and channel 1140.

In some aspects, computing device 1100 is an example of, or includes aspects of, the corresponding element described with reference to FIGS. 1, 2, 5, and 6. In some embodiments, computing device 1100 includes one or more processors 1105 that can execute instructions stored in memory subsystem 1110.

According to some aspects, computing device 1100 includes one or more processors 1105. Processor(s) 1105 is an example of, or includes aspects of, the corresponding element described with reference to FIG. 10.

According to some aspects, memory subsystem 1110 includes one or more memory devices. Memory subsystem 1110 is an example of, or includes aspects of, the memory and memory portions described with reference to FIGS. 1-2 and 10.

According to some aspects, communication interface 1115 operates at a boundary between communicating entities (such as computing device 1100, one or more user devices, a cloud, and one or more databases) and channel 1140 and can record and process communications. Communication interface 1115 is an example of, or includes aspects of, the corresponding element described with reference to FIG. 10.

According to some aspects, local chat application 1120 provides for a real-time conversation between the one user of a sub-group and the plurality of other members assigned to the same sub-group. Local chat application 1120 is an example of, or includes aspects of, the corresponding element described with reference to FIGS. 1 and 2. In some cases, local chat application 1120 is stored in the memory subsystem 1110 and is executed by the one or more processors 1105.

According to some aspects, conversational surrogate agent 1125 conversationally expresses a representation of the information contained in the summary from a different room. Conversational surrogate agent 1125 is an example of, or includes aspects of, the corresponding element described with reference to FIGS. 2 and 4. In some cases, conversational surrogate agent 1125 is stored in the memory subsystem 1110 and is executed by the one or more processors 1105.

According to some aspects, I/O interface 1130 is controlled by an I/O controller to manage input and output signals for computing device 1100. I/O interface 1130 is an example of, or includes aspects of, the corresponding element described with reference to FIG. 10.

According to some aspects, user interface component(s) 1135 enable a user to interact with computing device 1100. In some cases, user interface component(s) 1135 include an audio device, such as an external speaker system, an external display device such as a display screen, an input device (e.g., a remote control device interfaced with a user interface directly or through the I/O controller), or a combination thereof. In some cases, user interface component(s) 1135 include a GUI.

Some of the functional units described in this specification have been labeled as modules, or components, to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

While only a few embodiments of the disclosure have been shown and described, it will be obvious to those skilled in the art that many changes and modifications may be made thereunto without departing from the spirit and scope of the disclosure as described in the following claims.

The methods and systems described herein may be deployed in part or in whole through machines that execute computer software, program codes, and/or instructions on a processor. The disclosure may be implemented as a method on the machine(s), as a system or apparatus as part of or in relation to the machine(s), or as a computer program product embodied in a computer readable medium executing on one or more of the machines. In embodiments, the processor may be part of a server, cloud server, client, network infrastructure, mobile computing platform, stationary computing platform, or other computing platforms. A processor may be any kind of computational or processing device capable of executing program instructions, codes, binary instructions and the like, including a central processing unit (CPU), a general processing unit (GPU), a logic board, a chip (e.g., a graphics chip, a video processing chip, a data compression chip, or the like), a chipset, a controller, a system-on-chip (e.g., an RF system on chip, an AI system on chip, a video processing system on chip, or others), an integrated circuit, an application specific integrated circuit (ASIC), a field programmable gate array (FPGA), an approximate computing processor, a quantum computing processor, a parallel computing processor, a neural network processor, or other type of processor. The processor may be or may include a signal processor, digital processor, data processor, embedded processor, microprocessor or any variant such as a co-processor (math co-processor, graphic co-processor, communication co-processor, video co-processor, AI co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more threads. The thread may spawn other threads that may have assigned priorities associated with them; the processor may execute these threads based on priority or any other order based on instructions provided in the program code. The processor, or any machine utilizing one, may include non-transitory memory that stores methods, codes, instructions and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, network-attached storage, server-based storage, and the like.

A processor may include one or more cores that may enhance speed and performance of a multiprocessor. In embodiments, the process may be a dual core processor, quad core processors, other chip-level multiprocessor and the like that combine two or more independent cores (sometimes called a die).

The methods and systems described herein may be deployed in part or in whole through machines that execute computer software on various devices including a server, client, firewall, gateway, hub, router, switch, infrastructure-as-a-service, platform-as-a-service, or other such computer and/or networking hardware or system.

The software may be associated with a server that may include a file server, print server, domain server, internet server, intranet server, cloud server, infrastructure-as-a-service server, platform-as-a-service server, web server, and other variants such as secondary server, host server, distributed server, failover server, backup server, server farm, and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for the execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of programs across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements. The methods and systems described herein may be adapted for use with any kind of private, community, or hybrid cloud computing network or cloud computing environment, including those which involve features of software as a service (SaaS), platform as a service (PaaS), and/or infrastructure as a service (IaaS).

The methods, program codes, and instructions described herein and elsewhere may be implemented on a cellular network with multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, 4G, 5G, LTE, EVDO, mesh, or other network types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic book readers, music players and the like. These devices may include, apart from other components, a storage medium such as flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, network-attached storage, network storage, NVME-accessible storage, PCIE connected storage, distributed storage, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable code using a processor capable of executing program instructions stored thereon as a monolithic software structure, as standalone software modules, or as modules that employ external routines, code, services, and so forth, or any combination of these, and all such implementations may be within the scope of the disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices, artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described in the disclosure may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described in the disclosure, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable devices, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the devices described in the disclosure, as well as heterogeneous combinations of processors, processor architectures, or combinations of different hardware and software, or any other machine capable of executing program instructions. Computer software may employ virtualization, virtual machines, containers, dock facilities, portainers, and other capabilities.

Thus, in one aspect, methods described in the disclosure and combinations thereof may be embodied in computer executable code that, when executing on one or more computing devices, performs the steps thereof. In another aspect, the methods may be embodied in systems that perform the steps thereof and may be distributed across devices in a number of ways, or all of the functionality may be integrated into a dedicated, standalone device or other hardware. In another aspect, the means for performing the steps associated with the processes described in the disclosure may include any of the hardware and/or software described in the disclosure. All such permutations and combinations are intended to fall within the scope of the disclosure.

While the disclosure has been disclosed in connection with the preferred embodiments shown and described in detail, various modifications and improvements thereon will become readily apparent to those skilled in the art. Accordingly, the spirit and scope of the disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "with," "including," and "containing" are to be construed as open-ended terms (i.e., meaning "including, but not limited to,") unless otherwise noted. Recitations of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. The term "set" may include a set with a single member. No language in the specification should be construed as indicating any non-claimed element as essential to the practice of the disclosure.

While the foregoing written description enables one skilled to make and use what is considered presently to be the best mode thereof, those skilled in the art will understand and appreciate the existence of variations, combinations, and equivalents of the specific embodiment, method, and examples herein. The disclosure should therefore not be limited by the above-described embodiment, method, and examples, but by all embodiments and methods within the scope and spirit of the disclosure.

All documents referenced herein are hereby incorporated by reference as if fully set forth herein.

While the invention herein disclosed has been described by means of specific embodiments, examples and applications thereof, numerous modifications and variations could be made thereto by those skilled in the art without departing from the scope of the invention set forth in the claims.

What is claimed is:

1. A method for computer-mediated collaboration among a population of human participants using a plurality of networked computing devices, the method comprising:

providing a collaboration server running a collaboration application, the collaboration server in communication with the plurality of the networked computing devices, each computing device associated with one member of the population of human participants, the collaboration server defining a plurality of sub-groups of the population of human participants, the collaboration server comprising:

providing a local chat application on each networked computing device, the local chat application configured for displaying a conversational prompt received from the collaboration server, and for enabling real-time chat communication with other members of a sub-group assigned by the collaboration server, said real-time chat communication including sending chat input collected from the one member associated with the networked computing device to other members of the assigned sub-group; and enabling through communication between the collaboration application running on the collaboration server and the local chat applications running on each of the plurality of networked computing devices, comprising the following steps:

(a) send the conversational prompt to the plurality of networked computing devices, the conversational prompt comprising a question to be collaboratively discussed by the population of human participants, (b) present a representation of the conversational prompt to each member of the population of human participants on a display of the computing device associated with that member, (c) divide the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants, (d) collect and store a first conversational dialogue in a first memory portion at the collaboration server from members of the population of human participants in the first sub-group during an interval via a user interface on the computing device associated with each member of the population of human participants in the first sub-group, (e) collect and store a second conversational dialogue in a second memory portion at the collaboration server from members of the population of human participants in the second sub-group during the interval via a user interface on the computing device associated with each member of the population of human participants in the second sub-group,
(f) collect and store a third conversational dialogue in a third memory portion at the collaboration server from members of the population of human participants in the third sub-group during the interval via a user interface on the computing device associated with each member of the population of human participants in the third sub-group,
(g) process the first conversational dialogue at the collaboration server using a large language model to express a first conversational summary in conversational form,
(h) process the second conversational dialogue at the collaboration server using the large language model to express a second conversational summary in conversational form,
(i) process the third conversational dialogue at the collaboration server using the large language model to express a third conversational summary in conversational form,
(j) send the first conversational summary expressed in conversational form to each of the members of a first different sub-group, wherein the first different sub-group is not the first sub-group,
(k) send the second conversational summary expressed in conversational form to each of the members of a second different sub-group, wherein the second different sub-group is not the second sub-group,
(l) send the third conversational summary expressed in conversational form to each of the members of a third different sub-group, wherein the third different sub-group is not the third sub-group, and
(m) repeat steps (d) through (l) at least one time.

2. The method of claim 1 further comprising:
in step (j), sending the first conversational summary expressed in conversational form to each of the members of a first different sub-group expressed in first person as if the first conversational summary were coming from a member of the first different sub-group of the population of human participants;
in step (k), sending the second conversational summary expressed in conversational form to each of the members of a second different sub-group expressed in first person as if the second conversational summary were coming from a member of the second different sub-group of the population of human participants; and
in step (l), sending the third conversational summary expressed in conversational form to each of the members of a third different sub-group expressed in first person as if the third conversational summary were coming from a member of the third different sub-group of the population of human participants.

3. The method of claim 1 further comprising:
said enabling through communication between the collaboration application running on the collaboration server and the local chat applications running on each of the plurality of networked computing devices, comprising the following additional steps:
(n) process the first conversational summary, the second conversational summary, and the third conversational summary using the large language model to generate a global conversational summary expressed in conversational form.

4. The method of claim 3 further comprising:
said enabling through communication between the collaboration application running on the collaboration server and the local chat applications running on each of the plurality of networked computing devices, comprising the following additional steps:
(o) send the global conversational summary expressed in conversational form to each of the members of the first sub-group, the second sub-group, and the third sub-group.

5. The method of claim 3 comprising said generating of a final global conversational summary by weighting more recent ones of the global conversational summaries more heavily than less recent ones of the global conversational summaries.

6. The method of claim 1 wherein said first conversational dialogue, said second conversational dialogue and said third conversational dialogue each comprise a set of ordered chat messages comprising text.

7. The method of claim 6 wherein said first conversational dialogue, said second conversational dialogue and said third conversational dialogue each further comprise a respective member identifier for the member of the population of human participants who entered each chat message.

8. The method of claim 6 wherein said first conversational dialogue, said second conversational dialogue and said third conversational dialogue each further comprises a respective timestamp identifier for a time of day when each chat message is entered.

9. The method of claim 6 further comprising:
said enabling through communication between the collaboration application running on the collaboration server and the local chat applications running on each of the plurality of networked computing devices, comprising the following additional steps:
said processing said first conversational dialogue in step (g) further comprising determining a respective response target indicator for each chat message entered by the first sub-group, wherein the respective response target indicator provides an indication of a prior chat message to which each chat message is responding;
said processing said second conversational dialogue in step (h) further comprising determining a respective response target indicator for each chat message entered by the second sub-group, wherein the respective response target indicator provides an indication of a prior chat message to which each chat message is responding; and
said processing said third conversational dialogue in step (i) further comprises determining a respective response target indicator for each chat message entered by the third sub-group, wherein the respective response target indicator provides an indication of a prior chat message to which each chat message is responding.

10. The method of claim 6 further comprising:
said enabling through communication between the collaboration application running on the collaboration server and the local chat applications running on each of the plurality of networked computing devices, comprising the following additional steps:
said processing said first conversational dialogue in step (g) further comprising determining a respective sentiment indicator for each chat message entered by the first sub-group, wherein the respective sentiment indicator provides an indication of whether each chat message is in agreement or disagreement with prior chat messages;
said processing said second conversational dialogue in step (h) further comprising determining a respective sentiment indicator for each chat message entered by the second sub-group, wherein the respective sentiment indicator provides an indication of whether each chat message is in agreement or disagreement with prior chat messages; and
said processing said third conversational dialogue in step (i) further comprises determining a respective sentiment indicator for each chat message entered by the third sub-group, wherein the respective sentiment indicator provides an indication of whether each chat message is in agreement or disagreement with prior chat messages.

11. The method of claim 6 further comprising:
said enabling through communication between the collaboration application running on the collaboration server and the local chat applications running on each of the plurality of networked computing devices, comprising the following additional steps:
said processing said first conversational dialogue in step (g) further comprising determining a respective conviction indicator for each chat message entered by the first sub-group, wherein the respective conviction indicator provides an indication of conviction for each chat message;
said processing said second conversational dialogue in step (h) further comprising determining a respective conviction indicator for each chat message entered by the second sub-group, wherein the respective conviction indicator provides an indication of conviction for each chat message; and
said processing said third conversational dialogue in step (i) further comprises determining a respective conviction indicator for each chat message entered by the third sub-group, wherein the respective conviction indicator provides an indication of conviction each chat message is in the expressions of the chat message.

12. The method of claim 1 wherein the first unique portion consists of no more than ten members of the population of human participants, the second unique portion consists of no more than ten members of the population of human participants, and the third unique portion consists of no more than ten members of the population of human participants.

13. The method of claim 1 wherein said first conversational dialogue comprises chat messages comprising voice.

14. The method of claim 1 wherein said first conversational dialogue comprises chat messages comprising video.

15. The method of claim 1 wherein each of said repeating steps occurs after expiration of an interval.

16. The method of claim 15 wherein said interval is a time interval.

17. The method of claim 15 wherein said intervals is a number of conversational interactions.

18. The method of claim 1 wherein the first different sub-group is the second sub-group, and the second different sub-group is the third sub-group.

19. A system for computer-mediated collaboration among population of human participants using a plurality of networked computing devices, the system comprising:
a collaboration server running a collaboration application, the collaboration server in communication with the plurality of the networked computing devices, each computing device associated with one member of the population of human participants, the collaboration server defining a plurality of sub-groups of the population of human participants, the collaboration server comprising:
a local chat application on each networked computing device, the local chat application configured for displaying a conversational prompt received from the collaboration server, and for enabling real-time chat communication with other members of a sub-group assigned by the collaboration server, said real-time chat communication including sending chat input collected from the one member associated with the networked computing device to other members of the assigned sub-group; and
software components executed by the collaboration server and the local chat application for enabling thorough communication between the collaboration application running on the collaboration server and the local chat applications running on each of the plurality of networked computing devices, comprising the following steps:
(a) send the conversational prompt to the plurality of networked computing devices, the conversational prompt comprising a question to be collaboratively discussed by the population of human participants,
(b) present a representation of the conversational prompt to each member of the population of human participants on a display of the computing device associated with that member,
(c) divide the population of human participants into a first sub-group consisting of a first unique portion of the population, a second sub-group consisting of a second unique portion of the population, and a third sub-group consisting of a third unique portion of the population, wherein the first unique portion consists of a first plurality of members of the population of human participants, the second unique portion consists of a second plurality of members of the population of human participants and the third unique portion consists of a third plurality of members of the population of human participants,
(d) collect and store a first conversational dialogue in a first memory portion at the collaboration server from members of the population of human participants in the first sub-group during an interval via a user interface on the computing device associated with each member of the population of human participants in the first sub-group,
(e) collect and store a second conversational dialogue in a second memory portion at the collaboration server from members of the population of human participants in the second sub-group during the interval via a user interface on the computing device associated with each member of the population of human participants in the second sub-group,
(f) collect and store a third conversational dialogue in a third memory portion at the collaboration server from members of the population of human participants in the third sub-group during the interval via a user interface on the computing device associated with each member of the population of human participants in the third sub-group,
(g) process the first conversational dialogue at the collaboration server using a large language model to express a first conversational summary in conversational form, (h) process the second conversational dialogue at the collaboration server using the large language model to express a second conversational summary in conversational form, (i) process the third conversational dialogue at the collaboration server using the large language model to express a third conversational summary in conversational form, (j) send the first conversational summary expressed in conversational form to each of the members of a first different sub-group, wherein the first different sub-group is not the first sub-group, (k) send the second conversational summary expressed in conversational form to each of the members of a second different sub-group, wherein the second different sub-group is not the second sub-group, (l) send the third conversational summary expressed in conversational form to each of the members of a third different sub-group, wherein the third different sub-group is not the third sub-group, and (m) repeat steps (d) through (l) at least one time.

20. The system of claim 19 further comprising:
in step (j), sending the first conversational summary expressed in conversational form to each of the members of a first different sub-group expressed in first person as if the first conversational summary were coming from a member of the first different sub-group of the population of human participants;
in step (k), sending the second conversational summary expressed in conversational form to each of the members of a second different sub-group expressed in first person as if the second conversational summary were coming from a member of the second different sub-group of the population of human participants; and
in step (l), sending the third conversational summary expressed in conversational form to each of the members of a third different sub-group expressed in first person as if the third conversational summary were coming from a member of the third different sub-group of the population of human participants.

21. The system of claim 19 further comprising:
said enabling through communication between the collaboration application running on the collaboration server and the local chat applications running on each of the plurality of networked computing devices, comprising the following additional steps:
(n) process the first conversational summary, the second conversational summary, and the third conversational summary using the large language model to generate a global conversational summary expressed in conversational form.

22. The system of claim 21 further comprising:
said enabling through communication between the collaboration application running on the collaboration server and the local chat applications running on each of the plurality of networked computing devices, comprising the following additional steps:
(o) send the global conversational summary expressed in conversational form to each of the members of the first sub-group, the second sub-group, and the third sub-group.

23. The system of claim 21 comprising said generating of a final global conversational summary by weighting more recent ones of the global conversational summaries more heavily than less recent ones of the global conversational summaries.

24. The system of claim 19 wherein said first conversational dialogue, said second conversational dialogue and said third conversational dialogue each comprise a set of ordered chat messages comprising text.

25. The system of claim 24 wherein said first conversational dialogue, said second conversational dialogue and said third conversational dialogue each further comprise a respective member identifier for the member of the population of human participants who entered each chat message.

26. The system of claim 24 wherein said first conversational dialogue, said second conversational dialogue and said third conversational dialogue each further comprises a respective timestamp identifier for a time of day when each chat message is entered.

27. The system of claim 24 further comprising:
said enabling through communication between the collaboration application running on the collaboration server and the local chat applications running on each of the plurality of networked computing devices, comprising the following additional steps:
said processing said first conversational dialogue in step (g) further comprising determining a respective response target indicator for each chat message entered by the first sub-group, wherein the respective response target indicator provides an indication of a prior chat message to which each chat message is responding;
said processing said second conversational dialogue in step (h) further comprising determining a respective response target indicator for each chat message entered by the second sub-group, wherein the respective response target indicator provides an indication of a prior chat message to which each chat message is responding; and
said processing said third conversational dialogue in step (i) further comprises determining a respective response target indicator for each chat message entered by the third sub-group, wherein the respective response target indicator provides an indication of a prior chat message to which each chat message is responding.

28. The system of claim 24 further comprising:
said enabling through communication between the collaboration application running on the collaboration server and the local chat applications running on each of the plurality of networked computing devices, comprising the following additional steps:
said processing said first conversational dialogue in step (g) further comprising determining a respective sentiment indicator for each chat message entered by the first sub-group, wherein the respective sentiment indicator provides an indication of whether each chat message is in agreement or disagreement with prior chat messages;
said processing said second conversational dialogue in step (h) further comprising determining a respective sentiment indicator for each chat message entered by the second sub-group, wherein the respective sentiment indicator provides an indication of whether each chat message is in agreement or disagreement with prior chat messages; and
said processing said third conversational dialogue in step (i) further comprises determining a respective sentiment indicator for each chat message entered by the third sub-group, wherein the respective sentiment indicator provides an indication of whether each chat message is in agreement or disagreement with prior chat messages.

29. The system of claim 24 further comprising:
said enabling through communication between the collaboration application running on the collaboration server and the local chat applications running on each of the plurality of networked computing devices, comprising the following additional steps:
- said processing said first conversational dialogue in step (g) further comprising determining a respective conviction indicator for each chat message entered by the first sub-group, wherein the respective conviction indicator provides an indication of conviction for each chat message;
- said processing said second conversational dialogue in step (h) further comprising determining a respective conviction indicator for each chat message entered by the second sub-group, wherein the respective conviction indicator provides an indication of conviction for each chat message; and
- said processing said third conversational dialogue in step (i) further comprises determining a respective conviction indicator for each chat message entered by the third sub-group, wherein the respective conviction indicator provides an indication of conviction each chat message is in the expressions of the chat message.

30. The system of claim 19 wherein the first unique portion consists of no more than ten members of the population of human participants, the second unique portion consists of no more than ten members of the population of human participants, and the third unique portion consists of no more than ten members of the population of human participants.

31. The system of claim 19 wherein said first conversational dialogue comprises chat messages comprising voice.

32. The system of claim 19 wherein said first conversational dialogue comprises chat messages comprising video.

33. The system of claim 19 wherein each of said repeating steps occurs after expiration of an interval.

34. The system of claim 33 wherein said interval is a time interval.

35. The system of claim 33 wherein said intervals is a number of conversational interactions.

36. The system of claim 19 wherein the first different sub-group is the second sub-group, and the second different sub-group is the third sub-group.

* * * * *